(12) United States Patent  
Parks et al.

(10) Patent No.: US 7,944,008 B2
(45) Date of Patent: May 17, 2011

(54) SUSPENDED MEMBRANE PRESSURE SENSING ARRAY

(75) Inventors: Thomas R. Parks, Hermosa Beach, CA (US); Chi Cao, North Hollywood, CA (US)

(73) Assignee: Sierra Scientific Instruments, LLC, Los Angeles, CA (US)

( * ) Notice: Subject to any disclaimer, the term of this patent is extended or adjusted under 35 U.S.C. 154(b) by 189 days.

(21) Appl. No.: 12/108,479

(22) Filed: Apr. 23, 2008

(65) Prior Publication Data
US 2009/0004767 A1    Jan. 1, 2009

Related U.S. Application Data

(60) Provisional application No. 60/925,720, filed on Apr. 23, 2007.

(51) Int. Cl.
*G01L 9/00* (2006.01)
(52) U.S. Cl. .................. 257/419; 257/417; 438/53
(58) Field of Classification Search .............. 73/780; 257/419; 438/53
See application file for complete search history.

(56) References Cited

U.S. PATENT DOCUMENTS

| | | | |
|---|---|---|---|
| 4,526,043 A * | 7/1985 | Boie et al. | 73/862.046 |
| 4,561,450 A * | 12/1985 | Bryant | 600/593 |
| 4,644,801 A | 2/1987 | Kustanovich | |
| 4,827,763 A | 5/1989 | Bourland et al. | |
| 4,839,512 A | 6/1989 | Speck | |
| 4,862,743 A | 9/1989 | Seitz | |
| 5,070,735 A | 12/1991 | Reichert et al. | |
| 5,225,959 A | 7/1993 | Stearns | |
| 5,533,515 A | 7/1996 | Coller et al. | |
| 5,844,287 A | 12/1998 | Hassan et al. | |
| 5,942,733 A | 8/1999 | Allen et al. | |
| 5,983,727 A | 11/1999 | Wellman et al. | |
| 6,640,642 B1 | 11/2003 | Onose et al. | |

(Continued)

FOREIGN PATENT DOCUMENTS

KR    10-2008-0020281 A    3/2008

OTHER PUBLICATIONS

International Search Report and Written Opinion mailed Nov. 28, 2008 for International Application No. PCT/US2008/005287 (7 pages).

*Primary Examiner* — Thanh V Pham
*Assistant Examiner* — Caleb Henry
(74) *Attorney, Agent, or Firm* — Wolf, Greenfield & Sacks, P.C.

(57) ABSTRACT

An accurate and low cost macro pressure sensor is described. The pressure sensor includes an array of capacitive sensing elements formed at the intersections of sets of conductors. A lower set of conductors is supported by a substrate and an upper set of conductors is supported on a flexible polymer membrane. Capacitive sensing elements are formed where a conductor in the upper set overlaps a spacer in the lower set. Separators hold the membrane away from the substrate with a separation that, because of deflection of the membrane, varies in relation to the pressure applied to the membrane. As a result, the separation of conductors, and therefore capacitance, in each cell varies in response to the applied pressure. By attaching the membrane to the separators and optionally using slits in the membrane between capacitive sensing elements, measurements made in each capacitive sensing element can be mechanically decoupled.

22 Claims, 13 Drawing Sheets

U.S. PATENT DOCUMENTS

| | | |
|---|---|---|
| 6,945,115 B1 | 9/2005 | Wang |
| 7,196,694 B2 | 3/2007 | Roberts |
| 2003/0079547 A1 | 5/2003 | Baek |
| 2004/0206190 A1 | 10/2004 | Kawahata |
| 2004/0219706 A1 | 11/2004 | Wan |
| 2005/0068044 A1 | 3/2005 | Peine et al. |
| 2005/0148884 A1 | 7/2005 | Parks et al. |
| 2005/0208696 A1 | 9/2005 | Villa et al. |
| 2005/0226281 A1 | 10/2005 | Faraone et al. |
| 2006/0071286 A1 | 4/2006 | Axelrod et al. |
| 2007/0299345 A1 | 12/2007 | Adachi et al. |
| 2008/0202251 A1* | 8/2008 | Serban et al. .................. 73/780 |

* cited by examiner

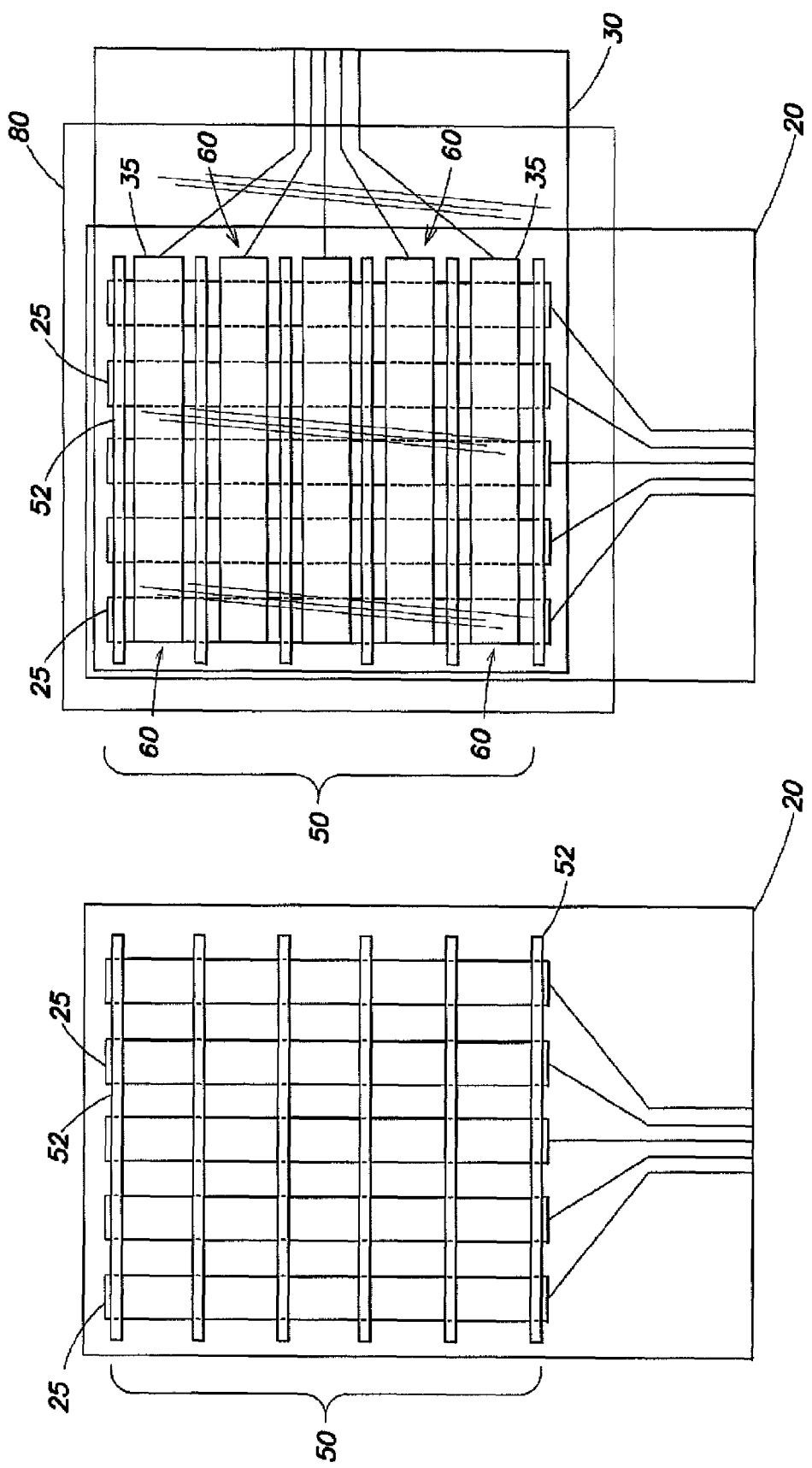

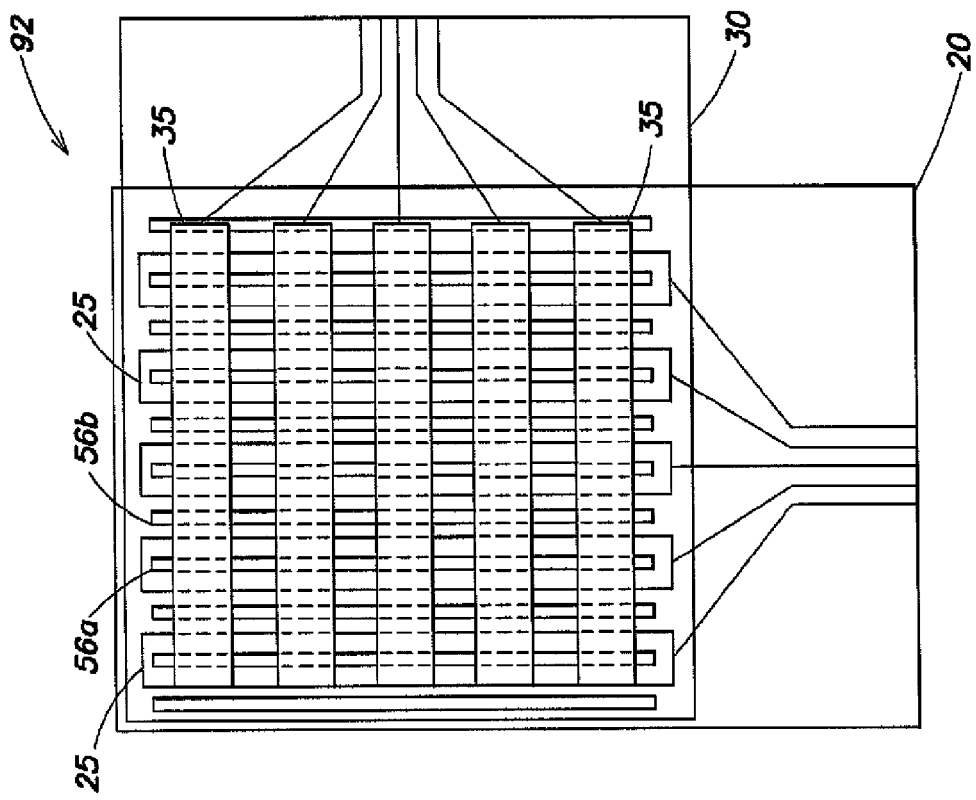
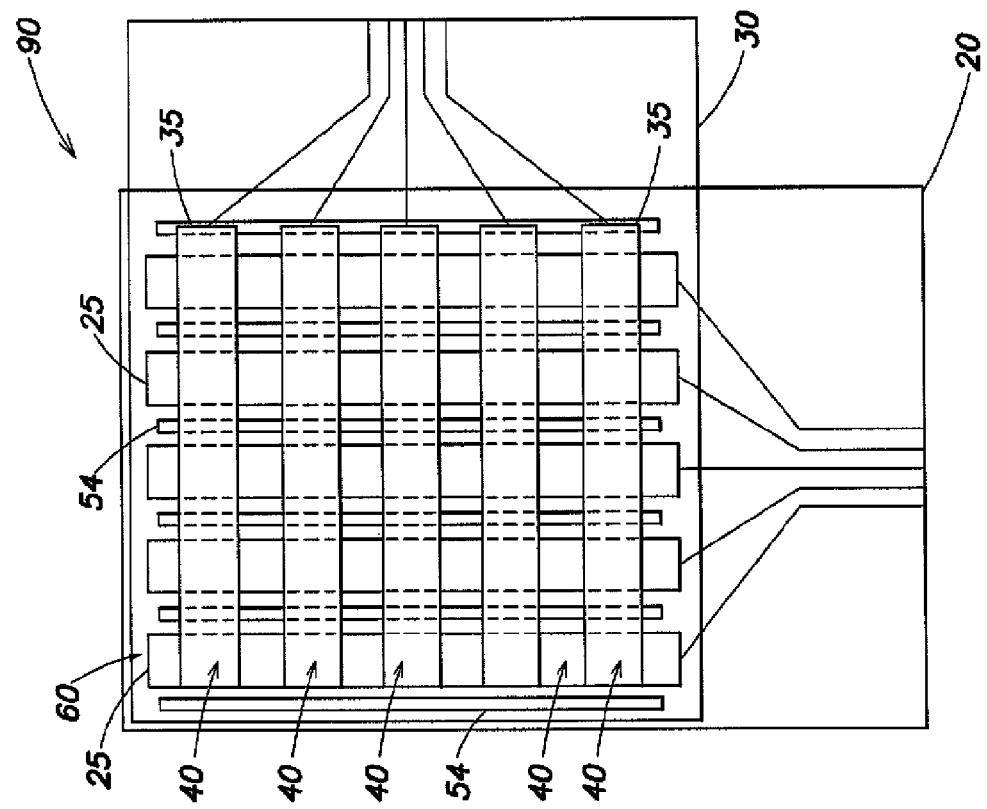

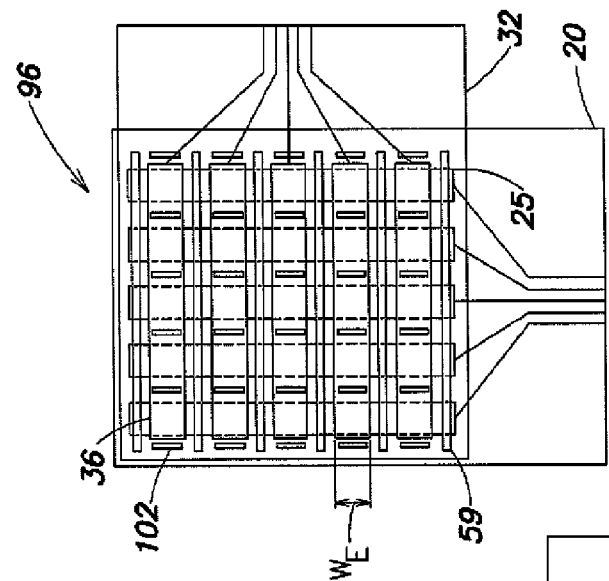
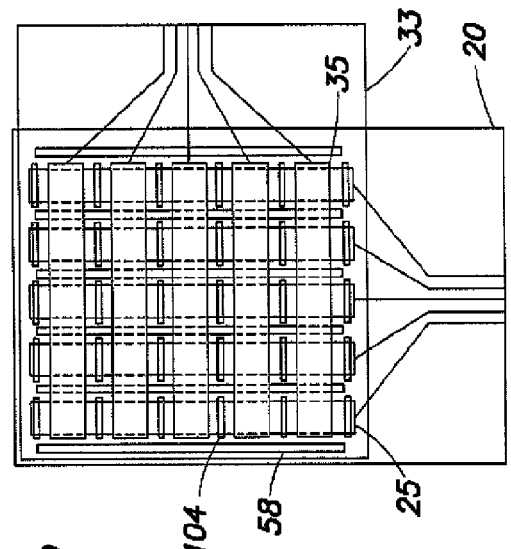
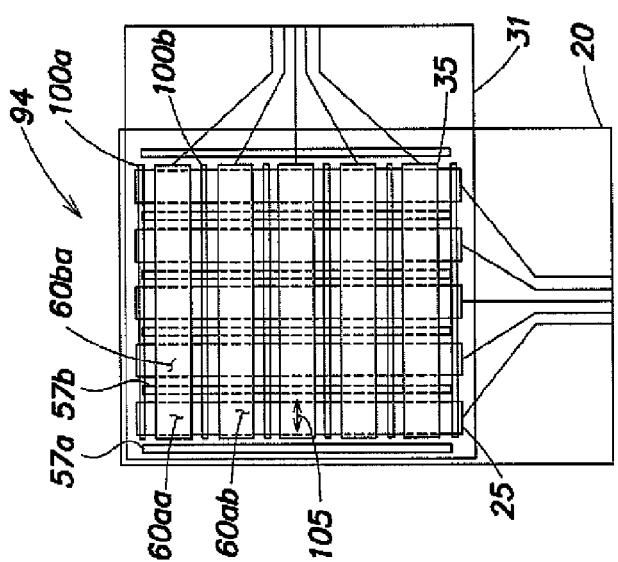

SUSPENDED MEMBRANE PRESSURE SENSING ARRAY

RELATED APPLICATIONS

This application claims the benefit under 35 U.S.C. 119(e) to U.S. provisional patent application Ser. No. 60/925,720, entitled SUSPENDED MEMBRANE PRESSURE SENSING ARRAY filed on Apr. 23, 2007, the entirety of which is herein incorporated by reference.

GOVERNMENT INTEREST

Research in connection with this application was supported by the National Institute of Health under Grant R44DK069131. The government has certain rights in this invention.

FIELD OF USE

Embodiments of this invention are directed to a capacitive two-dimensional pressure sensing array.

BACKGROUND

Pressure sensing arrays are useful to measure spatial pressure distributions. Some pressure sensing arrays incorporate sensors that measure an external pressure applied to a surface by capacitively relating the applied pressure into an electrical signal. Some capacitive pressure sensors detect pressure applied to an outer conductor by measuring a change in capacitance between the outer conductor and an inner conductor separated by a compliant layer. The compliant non-fluid separation layer compresses due to application of the pressure to the outer conductor causing a change in a separation between the inner conductor and the outer conductor, which in turn changes the capacitance between the inner conductor and the outer conductor.

A different form of capacitive pressure sensor employs a membrane that suspends an outer conductor over an inner conductor, where the outer conductor and the inner conductor are separated by a gap. Semiconductor and/or micro-electro-mechanical systems (MEMS) processing techniques have been used to make these types of pressure sensors, called "suspended membrane deflection" sensors. Through etching and deposition of materials a conductive membrane can be formed separated from a substrate conductor by a gap. Such sensors detect external pressure by measuring a change in capacitance between the membrane conductor and the substrate conductor caused by changes in a size of the gap, which changes as pressure is applied to the membrane.

SUMMARY

The invention relates to an apparatus for capacitively sensing force or pressure that incorporates a multi-dimensional array of capacitive sensing elements. Accordingly, in some embodiments of the invention, a method of making a capacitive multi-dimensional sensing apparatus is provided. The method includes providing a substrate having a plurality of elongated substrate electrodes, a separation layer, and a membrane having a plurality of elongated membrane electrodes. The separation layer includes one or more separators and one or more open portions. The method further includes orienting the membrane relative to the substrate such that each of at least two of the plurality of elongated membrane electrodes intersects each of at least two of the plurality of substrate electrodes forming a multi-dimensional array of capacitive elements with a capacitive element at each intersection. The substrate is oriented such that open portions of the separation layer align with the capacitive elements. The method also includes attaching the separation layer to the membrane.

In other embodiments of the invention, an apparatus for capacitively measuring force or pressure over a multi-dimensional area is provided. The apparatus includes a substrate having a plurality of elongated substrate electrodes, a membrane having a plurality of elongated membrane electrodes, and a separation layer having one or more separators. The separation layer fixedly connects and separates the substrate and the membrane. The membrane is configured to deflect in response to applied pressure. The membrane and the substrate are oriented such that each of at least two of the plurality of membrane electrodes intersects each of at least two of the plurality of substrate electrodes forming a multi-dimensional array of capacitive elements having a capacitive element at each intersection. The plurality of separators forms a plurality sensor regions of the apparatus. Each sensor region includes at least one capacitive element and a membrane portion of each sensor region is mechanically decoupled from a membrane portion of each adjacent sensor region.

In other embodiments of the invention, a method of operating a capacitive multi-dimensional sensing apparatus is provided. The method includes providing a capacitive multi-dimensional sensing apparatus. The apparatus has a substrate having a plurality of substrate electrodes and a membrane having a plurality of membrane electrodes. Each of at least two of the substrate electrodes intersects more than one membrane electrode in the plurality of membrane electrodes forming a multidimensional array of capacitive elements with a capacitive element at each intersection. The apparatus also includes a separation layer having open portions corresponding to a plurality of sensor regions.

The method also includes deflecting a first membrane portion corresponding to a first sensor region toward the substrate by stretching the first membrane portion with a first pressure while mechanically isolating membrane portions corresponding to adjacent sensor regions from the deflection of the first membrane portion in at least one direction. The method further includes measuring a change in capacitance between a substrate electrode and a membrane electrode corresponding to the deflection of the first membrane portion.

BRIEF DESCRIPTION OF THE DRAWINGS

Other advantages, novel features, and objects of the invention, and aspects and embodiments thereof, will become apparent from the following detailed description, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

FIG. 2B schematically depicts a plan view of the separators attached to the substrate, in accordance with some embodiments of the invention;

FIG. 2C schematically depicts a plan view of the exemplary capacitive two-dimensional sensing apparatus with an elastomeric covering, according to other embodiments of the invention;

FIG. 4A schematically depicts a plan view of a capacitive two-dimensional sensing apparatus with separators oriented parallel to an orientation of the substrate electrodes, according to other embodiments of the invention;

FIG. 4B schematically depicts a plan view of a capacitive two-dimensional sensing apparatus with a greater spatial frequency of separators as compared to the apparatus depicted in FIG. 4A, according to other embodiments of the invention;

FIG. 5A schematically depicts a plan view of a capacitive two-dimensional sensing apparatus with a membrane having a plurality of continuous slits aligned parallel to membrane electrodes, according to other embodiments of the invention;

FIG. 5B schematically depicts a plan view of a capacitive two-dimensional sensing apparatus with a membrane having a plurality of segmented slits aligned parallel to the membrane electrodes, according to other embodiments of the invention;

FIG. 5C schematically depicts a plan view of a capacitive two-dimensional sensing apparatus with a membrane having a plurality of segmented slits aligned perpendicular to the membrane electrodes, according to other embodiments of the invention;

DETAILED DESCRIPTION

Figure 1A:
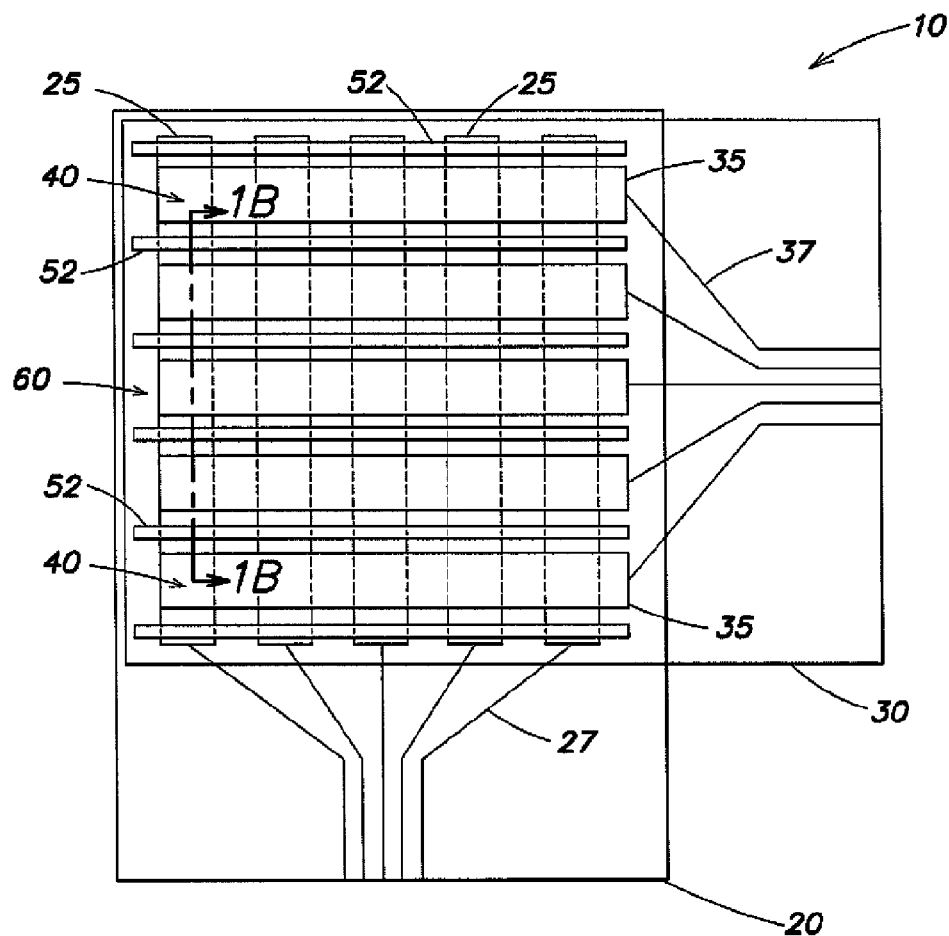
FIG. 1A schematically depicts a plan view of an exemplary capacitive two-dimensional sensing apparatus, according to an embodiment of the invention.

The inventors have recognized and appreciated that macroscopic pressure sensors that incorporate compliant separation layers may exhibit problems with the repeatability of measurements, as the same applied pressure may not always result in the same deflection due to changes in mechanical properties of the compliant separation layer. Mechanical properties of the compliant separation layer may be a function of temperature and other ambient conditions and/or may change with the age of the layer or its history of deformation.

The inventors have also recognized that silicon-based processing is not well suited for making suspended membrane deflection pressure-sensing arrays that must cover a large (macroscopic) area. Further, some applications require that a pressure-sensing array cover a curved surface, which is not generally compatible with silicon-based processing.

Exemplary capacitive multi-dimensional pressure sensing apparatuses exhibit improved repeatability of pressure measurement and less thermal sensitivity than comparable capacitive sensing arrays that employ compliant separation layers, in accordance with some embodiments of the invention. Exemplary capacitive multi-dimensional pressure sensing apparatuses may have lower production cost than some compliant separation layer designs because exemplary apparatuses may be more easily mass-produced.

Some exemplary capacitive multi-dimensional pressure sensing apparatuses may be fabricated, at least in part, using flex circuit-type processes allowing the sensing apparatus to be wrapped around curved or other non-flat surfaces, unlike rigid arrays of capacitive gap sensors produced with traditional silicon-based processing techniques. Some exemplary capacitive multi-dimensional pressure sensing apparatuses may have a sensing array covering a macroscopically large area of a single substrate, which may be prohibitively expensive with traditional silicon-based processing techniques.

Embodiments of the invention provide a macro-capacitive pressure sensing apparatus with a multi-dimensional array of capacitive sensing elements, a method of making the apparatus and a method of operating the apparatus. The apparatus may have, for example, a two-dimension array of sensing elements. The capacitive sensing elements may also be referred to as capacitive elements or sensor cells herein. The apparatus includes a substrate, a membrane and a separation layer that separates the substrate and the membrane.

The substrate has a plurality of elongated substrate electrodes and the membrane supports a plurality of membrane electrodes. In assembling the sensing apparatus, the membrane may be oriented such that the membrane electrodes cross or intersect the substrate electrodes. The separation layer includes one or more separators, which hold the membrane away from the substrate. As a result, each intersection of a substrate electrode and a membrane electrode forms a capacitive element. The membrane is of a polymer or other suitable material such that, as positive external pressure is applied to the membrane, the membrane stretches deflecting into a gap in the separation layer toward the rigid or semi-rigid substrate. When the pressure is removed, the membrane returns to its original position.

Mechanical decoupling may be provided between the capacitive elements. As a result, if a first sensor region is mechanically decoupled from a second adjacent sensor region, a pressure applied only to a portion of the membrane corresponding to the first sensor region will not cause a substantial deflection or a change in tension of a portion of the membrane corresponding to the second sensor region. Mechanical decoupling may be provided by attaching the membrane to the separators. The one or more separators may be positioned to bound, at least partially, the capacitive sensing elements so as to form sensor regions, with each sensor region including at least one capacitive element. By attaching the membrane to the separators, a separator between adjacent sensor regions mechanically decouples portions of the membrane corresponding to each adjacent sensor region. Mechanical separation can alternatively or additionally be provided between sensor elements by forming slits in the membrane between the sensor regions to be decoupled.

Slits in the membrane may also increase the sensitivity of the apparatus by increasing membrane deflection in a membrane portion of each sensor region resulting from an applied pressure.

By appropriate selection of materials and construction, a "gap height" or "gap separation" at an intersection of a substrate electrode and a membrane electrode is a repeatable function of pressure applied to the membrane at the intersection. The gap height or gap separation at the intersection is related to the capacitance between the intersecting electrodes. As a result, a pressure applied to the membrane at the intersection may be determined from the measured capacitance of the intersection. Thus, the apparatus provides an array of capacitive pressure sensors when the plurality of membrane electrodes and the plurality of substrate electrodes are connected with electronics that can measure the capacitance at each intersection of the membrane electrodes and the substrate electrodes.

In some embodiments, the substrate and membrane may be substantially planar. In other embodiments, the apparatus may be cylindrical, with a cylindrically shaped substrate. The plurality of substrate electrodes may encircle the cylindrically shaped substrate and the plurality of membrane electrodes may extend parallel to a longitudinal axis of the substrate. In other embodiments, the substrate may have various shapes, as the invention is not limited in this respect. Fabrication of the membrane by patterning a flexible circuit patterned with conductors shaped and positioned to form membrane electrodes allows the sensing apparatus to be formed in a wide range of shapes. Moreover, fabrication in this way may be more economical than producing traditional silicon-based capacitive pressure sensing arrays or other known sensor array designs.

For example, cylindrical pressure sensing arrays have been used in motility visualization system (MVS) catheters. MVS catheters may be inserted into the gastrointestinal (GI) tract of a subject to measure sphincter pressure. As is known in the art, a typical MVS catheter for use with a human subject may require a macro-scale pressure-sensing array that is between about 4-20 inches long and about 0.25-2 inches in circumference. A description of an MVS catheter employing an array of discrete pressure sensors appears in co-pending U.S. patent application Ser. No. 10/961,981 entitled HIGH RESOLUTION SOLID STATE PRESSURE SENSOR (published as US 2005/0148884 A1), the entirety of which is herein incorporated by reference. Pressure sensor arrays as fabricated herein may be used in these and other applications.

Some exemplary macro-capacitive multi-dimensional pressure sensing apparatuses in cylindrical form with sufficiently large sensing arrays may be used for the measurement of sphincter pressure in the gastrointestinal (GI) tract. Other cylindrical macro-capacitive pressure sensing apparatuses may be incorporated into manometry probes.

Although aspects of the invention are described below primarily with respect to pressure sensing, one of ordinary skill in the art knows that pressure is force applied over an area. Thus, the same apparatus may be used to measure force and/or pressure.

Figure 1B:
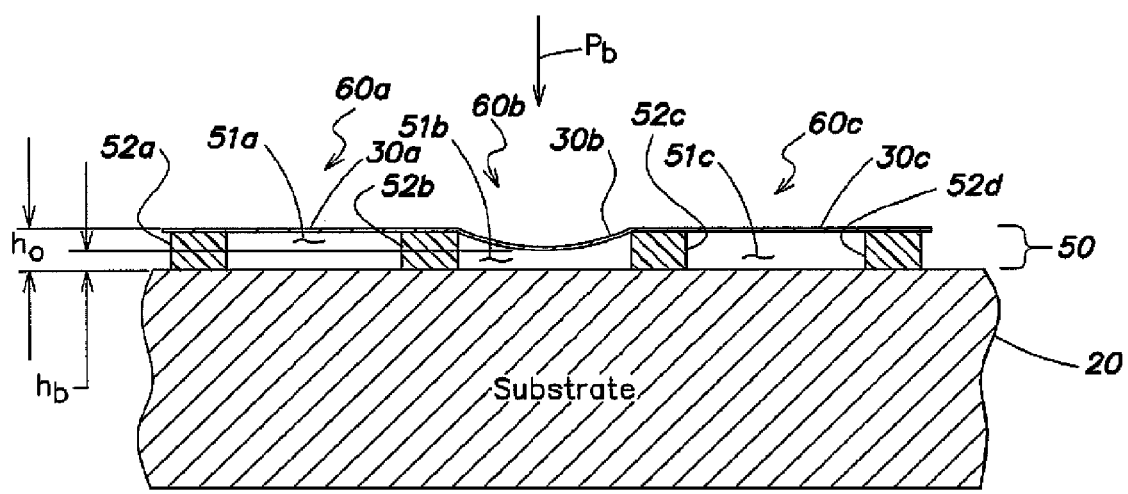
FIG. 1B schematically depicts a side cross-sectional view of a portion of the two-dimensional sensing array shown in FIG. 1A.

FIGS. 1A and 1B schematically illustrate a capacitive two-dimensional pressure sensing apparatus, in accordance with embodiments of the invention. Apparatus 10 includes a substrate 20, a membrane 30 and a separation layer 50 that separates substrate 20 and membrane 30. Substrate 20 may be formed of a rigid or semi-rigid material. As used herein, the term "non-compliant" material refers to a rigid material, a semi-rigid material or a combination of rigid and semi-rigid materials. In some embodiments, substrate 20 is made of a material that can be machined, cast and/or molded, such as a metal, a hard plastic, etc.

A plurality of elongated substrate electrodes 25 may be supported by substrate 20. In some embodiments, substrate electrodes 25 may be deposited on substrate 20, attached to substrate 20 and/or formed in substrate 20, or in any other suitable manner or configuration, as the invention is not limited in this respect. For embodiments in which substrate 20 is formed of a conducting material, a non-conducting material may be used to separate the electrodes from the conducting portions of the substrate, such as by providing a coating over the substrate in at least the regions where the substrate electrodes are to be supported. Suitable non-conducting materials include dielectrics.

Membrane 30 may be configured to deflect by stretching in response to force or pressure applied to membrane 30. Membrane 30 may be attached to and supported by separation layer 50. Separation layer 50 may be attached to substrate 20 or may be monolithic with substrate 20. Separation layer 50 may include one or more separators 52 that are each attached to membrane 30 and a plurality of open portions 51 that form "gaps." Separators 52 may form a plurality of sensor regions 60 positioned between adjacent separators 52.

A plurality of elongated membrane electrodes 35 may be supported by membrane 30. In some embodiments, membrane electrodes 35 may be deposited on membrane 30, attached to membrane 30, or formed in membrane 30. In some embodiments, membrane electrodes 35 may be disposed on a side of membrane 30 facing toward substrate 20, as depicted. In other embodiments, membrane electrodes 35 may be disposed on a side of membrane 30 facing away from substrate 20, may extend through a thickness of membrane 30 and/or may be sandwiched between other layers of membrane 30 in a multilayer membrane. For example, membrane electrodes 35 may be formed by patterning a conductive layer on a flexible substrate using known flexible circuit fabrication techniques. However, any suitable fabrication technique may be used, as the invention is not limited in this respect.

A capacitive element 40 is formed where a substrate electrode 25 in the plurality of substrate electrodes intersects a membrane electrode 35 in the plurality of membrane electrodes. Intersections of sensor electrodes 25 and membrane electrodes 35 form a multi-dimensional array of capacitive elements 40. As is apparent to one of skill in the art, based on geometry, each of at least two of substrate electrodes 25 must intersect each of at least two of membrane electrodes 35 to form a multi-dimensional array of capacitive elements 40. In some embodiments, every substrate electrode 25 intersects every membrane electrode 35, as depicted in FIGS. 1A and 1B. However, not every substrate electrode 25 need intersect every membrane electrode 35 as long as a multi-dimensional array of capacitive elements 40 is formed, as the present invention is not limited in this respect.

As will be apparent to one of skill in the art, the term "intersect," as used herein to describe electrodes, means that a membrane electrode overlays or crosses and, from some aspect angles, appears to "intersect" a substrate electrode, or vice versa, as shown in FIG. 1A. However, from other aspect angles, the substrate electrodes 25 and the membrane electrodes 35 may not appear to intersect as they are separated by a gap and do not make physical contact with one another.

FIG. 1B is a cross-sectional view of a portion of the apparatus 10 depicted in FIG. 1A that illustrates how applied pressure $P_b$ reduces a distance $h_b$ between substrate electrodes 25 and membrane electrodes 35 causing increased capacitance. Separation layer 50 supports membrane 30 and maintains a nominal distance (gap height) $h_0$ between substrate electrodes 25 and membrane electrodes 35. Though, as can be seen, separation layer 50 is not a solid layer. Rather, separation layer 50 comprises a plurality of separators 52a, 52b, 52c with spaces between them, such that the membrane 30 may be suspended over the spaces by attachment to the members, such as separators 52a, 52b, 52c. However, in other embodiments, separation layer 50 may include a separator that includes on or more open spaces, as the invention is not limited in this respect.

Separators 52a, 52b, 52c may be formed in any suitable way. In some embodiments separators 52a, 52b, 52c of separation layer 50 are attached to substrate 20, as depicted. In other embodiments, separators 52a, 52b, 52c may be monolithic with substrate 20. Separators 52a, 52b, 52c of separation layer 50 are attached to membrane 30.

Attachments between separators 52a, 52b, 52c and membrane 30 ensure that membrane deflection under applied force or pressure $P_b$ is primarily due to stretching of membrane 30. If membrane 30 is not attached to separators 52a, 52b, 52c, membrane 30 may slip or slide with respect to separators 52a, 52b, 52c, which may result in unwanted mechanical hysteresis under changes in applied pressure $P_b$.

Gaps or open portions 51a, 51b, 51c between separators 52a, 52b, 52c, or within a separator, may be occupied by air or another gas. However, in some embodiments gaps may be filled by a liquid, or other suitable medium. Examples of suitable media include, but are not limited to, air, nitrogen gas, dielectric liquids, etc.

FIG. 1B also illustrates how separators 52a, 52b, 52c mechanically isolate membrane deflections between adjacent sensor regions 60a, 60b and 60c. As described above, membrane 30 is attached to and supported by separators 52a, 52b, 52c, which divide the membrane into membrane portions 30a, 30b, 30c, etc. When pressure $P_b$ is applied to membrane portion 30b in sensor region 60b, pressure $P_b$ stretches membrane portion 30b, deflecting it toward substrate 20. This stretching reduces a height $h_b$ of the gap that separates membrane portion 30b and substrate 20. The reduction of the gap height $h_b$ increases a capacitance between a substrate electrode and a membrane electrodes in sensor region 60b. As illustrated by FIG. 1B, because membrane portion 30b in sensor region 60b is fixedly attached at spacers 52b and 52c, adjacent membrane portions 30a, 30c in sensor regions 60a and 60c, are not deflected in response to pressure $P_b$.

Figure 2A:
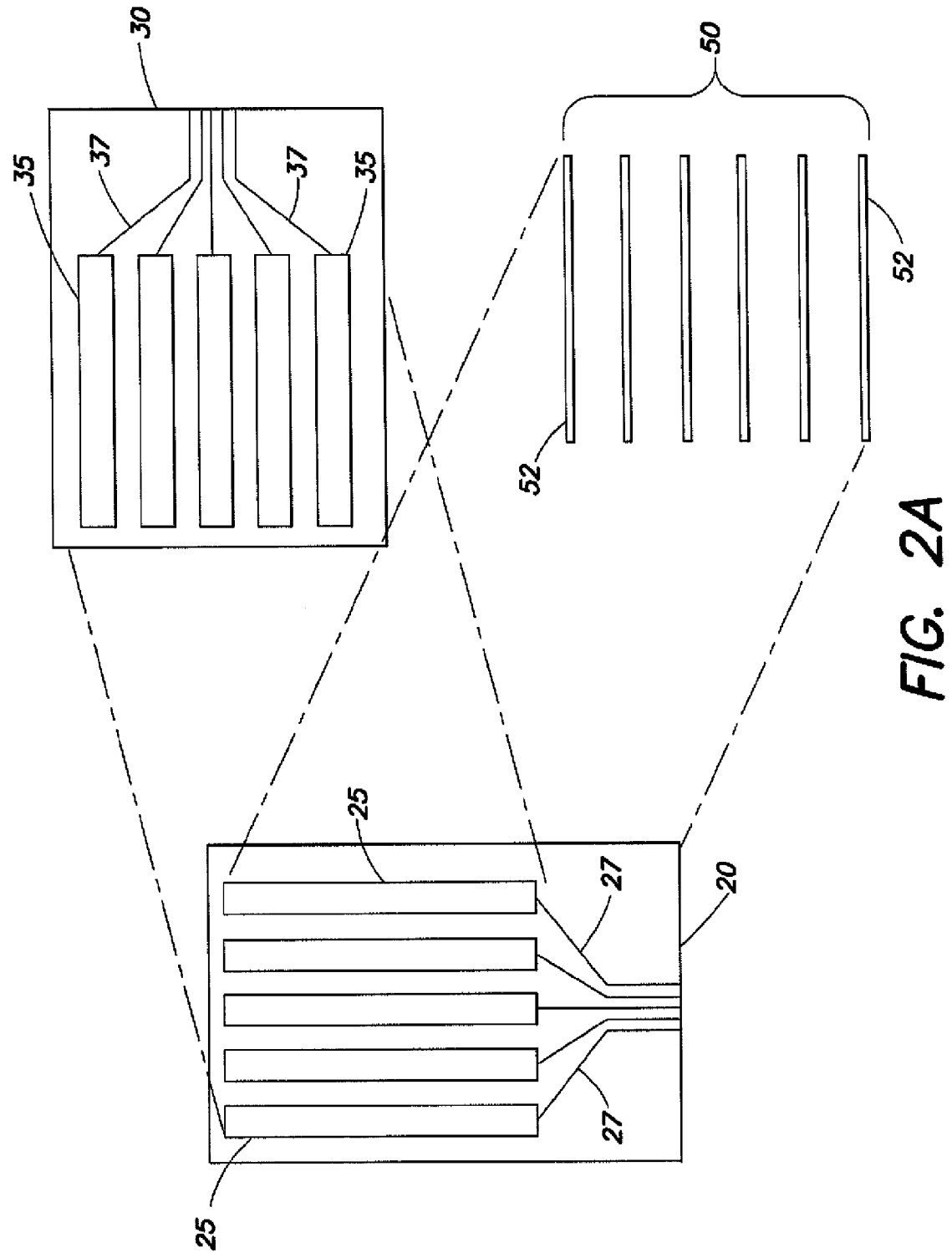
FIG. 2A is an exploded schematic plan view of a substrate, a membrane and separators that are components of the two-dimensional sensing apparatus depicted in FIGS. 1A and 1B.

FIG. 2A illustrates an exploded view of components of the exemplary apparatus 10. The components include substrate 20 with elongated substrate electrodes 25, membrane 30 with elongated membrane electrodes 35, and separation layer 50 having separators 52.

In some embodiments, substrate 20 may be planar, as shown. In other embodiments, substrate 20 may be curved or have a different three dimensional configuration, as the invention is not limited in this respect. Substrate 20 may be rectangular as shown; though in other embodiments substrate 20 may have other shapes, as the invention is not limited in this respect. For example, a cylindrical substrate is depicted and described below with respect to FIGS. 6A and 6B.

In some embodiments, substrate electrodes 25 may be substantially parallel to each other, as shown. In other embodiments, only some of substrate electrodes 25 may be substantially parallel to each other, or none of the substrate electrodes 25 may be substantially parallel to each other, as the invention is not limited in this respect. For example, substrate electrodes 25 may be configured as parallel conductive strips. In some embodiments, substrate electrodes 25 may be rectangular, as shown; however, other embodiments may include substrate electrodes 25 with other shapes, as the invention is not limited in this respect.

Similarly, in some embodiments, membrane electrodes 35 may be substantially parallel to each other, as shown. In other embodiments, only some of membrane electrodes 35 may be substantially parallel to each other, or none of membrane electrodes 35 may be substantially parallel to each other, as the invention is not limited in this respect. In some embodiments, membrane electrodes 35 may be rectangular, as shown; however, other embodiments may include membrane electrodes 25 with other shapes, as the invention is not limited in this respect.

In some embodiments, each substrate electrodes 25 may have an electrical connection 27, as shown. Similarly, in some embodiments, each membrane electrode 35 may have an electrical connection 37, as shown. Electrical connections 27 and 37 allow an electrical signal to be applied to a pair of electrodes 25, 35. Using known capacitance measurement techniques, or any other suitable measurement, an electrical output measured on the same pair of electrodes can be used to determine capacitance between the pair of electrodes. As described above, capacitance between electrodes 25, 35 is a function of a deflection of membrane 30 at the electrodes, and the deflection of membrane 30 is a function of pressure. Thus, electrical connections 27 and 37 enable pressure measurement for an array of locations to be made using the apparatus 10.

In the embodiment illustrated, membrane 30 may be fabricated using flex-circuit manufacturing techniques. The electrodes 35 as well as connections 37 to those electrodes may be formed as part of the flex-circuit fabrication.

Separators 52 are shown as elongated strips running parallel to membrane electrodes 35, in the depicted embodiment. Separators 52 are also shown with a spacing that approximates a distance between membrane electrodes 35. However, neither this orientation, nor this spacing is a limitation on the invention, and any suitable orientation or spacing may be used.

Separators 52 may be formed of any suitable material. In the embodiment illustrated, in FIG. 2A, separators 52 may be formed of or be coated with adhesive material allowing attachment to substrate 20 and membrane 30. An example of a suitable material is an uncured or partially cured epoxy strip. However, any suitable material may be used to coat and/or form separators 52.

FIG. 2B depicts substrate 20 with separation layer 50 attached. Such a structure may be formed according to a process in which separation layer 50 is formed on substrate 20, then membrane 30 is attached to separation layer 50.

Separators 52 of separation layer 50 may be attached to substrate 20 and/or membrane 30 by any suitable process or means including, but not limited to: adhering, bonding, affixing, mechanically fixing, welding, etc. Maintaining a controlled height $h_0$ (see FIG. 1B) of separation layer 50 may be important to maintain a desired relationship between capacitance and applied pressure and for having a uniform response among capacitive elements 40 formed by the intersecting regions of substrate electrodes 25 and membrane electrodes 35. In some embodiments, this control of the height may be effected by use of epoxy strips for separators 52 in separation layer 50 where the epoxy has small or predictable changes in thickness during the bonding process. Though, in other embodiments, fillers or other members may be incorporated into a matrix. As a specific example, separators 52 may be formed of epoxy containing spacing aggregates such as glass beads.

Alternatively or additionally, jigs, fixtures or other fabrication techniques may be used to hold substrate 20 and membrane 30 in a desired position while the components of the apparatus are being assembled. For example, temporary spacers, such as strips of the desired gap thickness $h_0$, may be installed between the epoxy strips during the epoxy bonding operation and then removed after substrate 20, separation layer 50 and membrane 30 have been coupled. In some embodiments, the temporary spacers may be formed of a material with a high melting temperature to resist melting during the bonding process. In some embodiments, the temporary spacers may be formed of a material with a low coefficient of friction for easy removal. For example, teflon strips may be used as temporary spacers. These and similar techniques allow for control of the separation height that might otherwise be adversely affected during the bonding process when the separation layer 50 may be placed under compressive load.

FIG. 2C schematically depicts an elastomeric outer layer 80 that may be applied over membrane 30 to protect apparatus 10 from contamination by media such as particulates, liquids or vapors. Also, the elastomeric outer layer 80 separates fluid (i.e. gas or liquid) outside the apparatus from fluid (i.e. gas or liquid) within the gaps between membrane 30 and substrate 20, which may be desirable when membrane 30 includes slits as described below with respect to FIGS. 5A to 5C. Elastomeric outer layer 80 may be a permanent part of apparatus 10, or elastomeric outer layer 80 may be removable and replaceable. In some embodiments, elastomeric outer layer 80 may be a sheath that covers a cylindrical apparatus 110 which is incorporated into a probe, as described below with respect to FIG. 11B. In some embodiments, both an elastomeric layer 80, which is attached to membrane 30, and a disposable sheath may be employed.

Figure 3A:
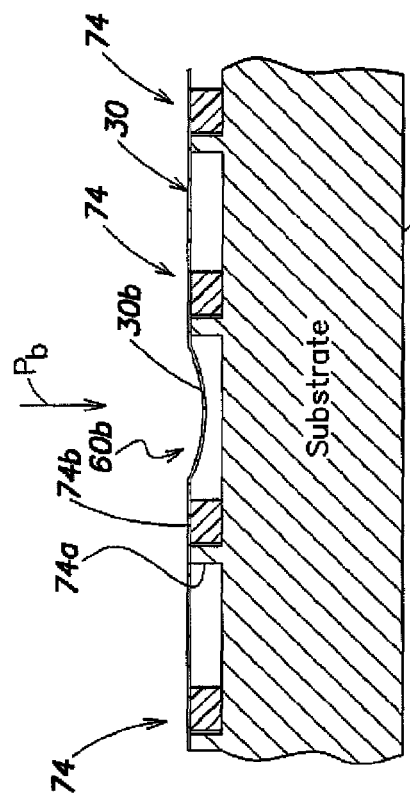
FIG. 3A schematically depicts a side cross-sectional view of a capacitive two-dimensional sensing apparatus having a separator that includes an adhesive element between support elements that are monolithic with the substrate, according to other embodiments of the invention.
Figure 3B:
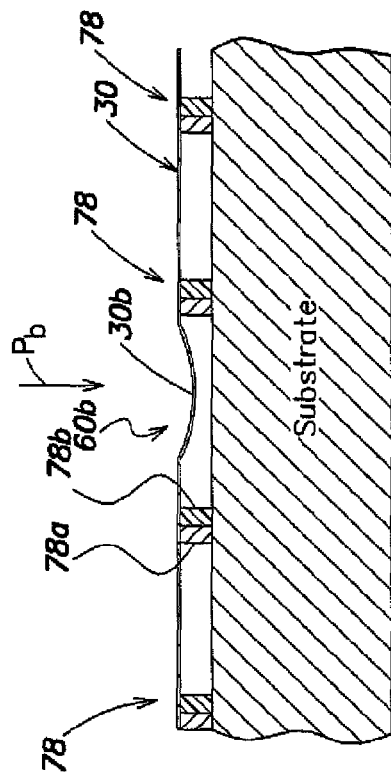
FIG. 3B schematically depicts a side cross-sectional view of a sensing array apparatus with a separator that includes an adhesive element and a support element that is monolithic with the substrate, according to other embodiments of the invention.
Figure 3C:
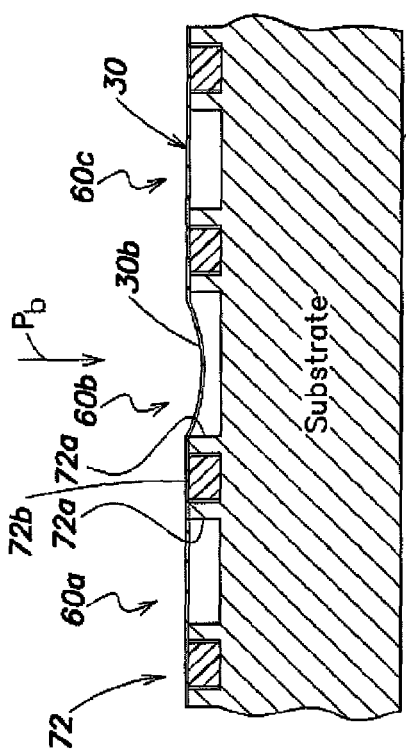
FIG. 3C schematically depicts a side cross-sectional view of a capacitive two-dimensional sensing apparatus with the membrane attached to support elements that are monolithic with the substrate, according to other embodiments of the invention.

In FIGS. 2A and 2B, separation layer 50 is formed separate from both substrate 20 and membrane 30. However, such a fabrication process is not required as separation layer 50 may be monolithic with substrate 20, deposited onto substrate 20, formed together with membrane 30, etc., in accordance with embodiments of the invention. FIGS. 3A-3D schematically illustrate side cross-sectional detail views of other embodiments of the apparatus 10 showing different configurations for separation layers. FIGS. 3A-3D illustrate that separation layer 50 need not be separate from substrate 20 and membrane 30. In some embodiments, part or all of the separation layer is monolithic with the substrate, as shown in FIGS. 3A, 3B and 3C.

Figure 3D:
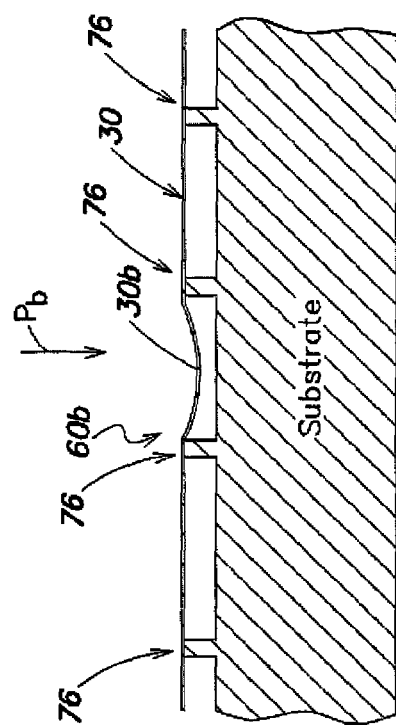
FIG. 3D schematically depicts a side cross-sectional view of a capacitive two-dimensional sensing apparatus with each separator including a rigid spacer adjacent to an adhesive element, according to other embodiments of the invention.

FIGS. 3A-3D also illustrate that a separator 52 of the separation layer 50 need not be a single element that both separates and secures membrane 30 to substrate 20. In some embodiments, each separator may include a spacer element and an adhesive element, as shown in FIGS. 3A, 3B and 3D. In each of FIGS. 3A-3D, an example operating condition is depicted with a pressure $P_b$ is applied to a center sensor region 60b causing center membrane portion 30b to stretch and deflect toward a substrate.

In FIG. 3A, a substrate 21 is shaped to provide double "rib type" features that control the undeflected height of the gap, in accordance with embodiments of the invention. Each separator 72 includes an adhesive element 72b disposed between spacer elements in the form of two "ribs" 72a that are monolithic with a substrate 21. The two ribs 72a may be machined into substrate 21 or formed in any other suitable way. Adhesive element 72b is attached to the substrate 21 and the membrane 30 using any suitable process or means including but not limited to: adhering, bonding, affixing, mechanically fixing, welding etc.

In FIG. 3B, a substrate 22 is shaped to provide single "rib-type" features that control the undeflected height of the gap, in accordance with other embodiments of the invention. Each separator 74 may include a rib 74a that is monolithic with the substrate 22 and an adhesive element 74b that is attached to the membrane 30 and the substrate 22, as depicted.

In FIG. 3C, each separator is a rib 76 that is monolithic with the substrate 23, in accordance with other embodiments. The rib 76 controls the undeflected height of the gap and is attached to the membrane 30. The embodiments depicted in FIGS. 3A to 3C incorporating monolithic "rib" features can provide for precise gap height if the rib height can be precisely controlled during fabrication of the substrate.

In FIG. 3D, each separator 78 includes a spacer element 78a and an adhesive element 78b, in accordance with another embodiment of the invention. Because spacer elements 78a need not be adhesive, they may be formed of plastic, metal or any other suitable materials, and can be secured to the adhesive elements 78b either before or after the adhesive elements are attached to either substrate 24 or membrane 30. In some embodiments, spacer element 78a may have a same cross-sectional width and a height as those of adhesive element 78b, as depicted. However, in other embodiments, spacer element 78*a* may have a different width than that of adhesive element 78*b* and/or spacer element 78*a* may have a greater height that adhesive element 78*b*.

Figure 4D:
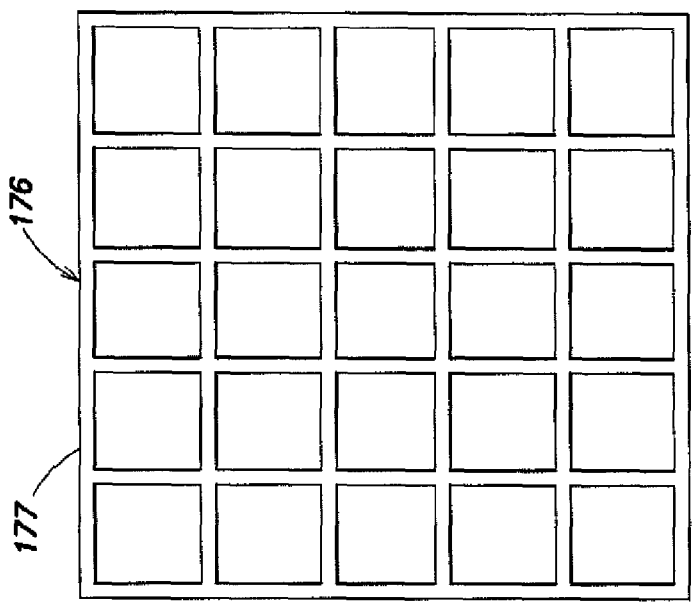
FIG. 4D schematically depicts a plan view of the separation layer of the apparatus shown in FIG. 4C.

FIGS. 4A to 4D schematically depict apparatuses with different separation layer configurations, in accordance with other embodiments of the invention. In some embodiments, separators 54 are elongated so that more than one intersection between membrane electrodes 35 and substrate electrodes 25 lies between adjacent separators 54 forming more than one capacitative element 40 in each sensor region 60, as shown in FIG. 4A.

In some embodiments separators 52 may be oriented parallel to membrane electrodes 35, as shown in FIG. 2B and described above. In some embodiments, separators 54 may be oriented parallel to substrate electrodes 25, as shown in FIG. 4A. In other embodiments, separators may not be oriented parallel to substrate electrodes 25 or membrane electrodes 35, as the invention is not limited in this respect.

In some embodiments adjacent separators 54 may be spaced on approximately the same pitch as the electrodes, such that adjacent separators 54 are separated by a substrate electrode 25, as depicted in FIG. 4A. In other embodiments, separators 56*a*, 56*b* may be situated at a greater spatial frequency than one per substrate electrode 25. For example, in FIG. 4B some separators 56*b* are disposed between substrate electrodes 25 and some separators 56*a* are disposed on substrate electrodes 25.

Although the embodiments depicted above include "strip-like" separators being parallel and in-between either membrane electrodes 35 or substrate electrodes 25, many other configurations fall within the scope of the present invention. Examples of other configurations include, but are not limited to: squares of separators bordering each intersection of substrate electrodes 25 and membrane electrodes 35, squares or strips of separators at some bias angle with respect to the substrate electrodes 25 and/or at some bias angle with respect to the membrane electrodes 35, etc.

As discussed above, securing membrane 30 to separators 54 is one mechanism to reduce or eliminate mechanical cross-coupling between adjacent sensor regions 60 by mechanically decoupling a membrane portion of one sensor region 60 from a membrane portion of an adjacent sensor region 60. Within a sensor region 60 containing multiple capacitive sensing elements 40, a capacitive sensing element 40 may be mechanically decoupled from adjacent capacitive sensing elements 40 in at least one direction due to a configuration of the separators 52, even though it is not mechanically decoupled from adjacent capacitive sensing elements 40 in a different direction.

Figure 4C:
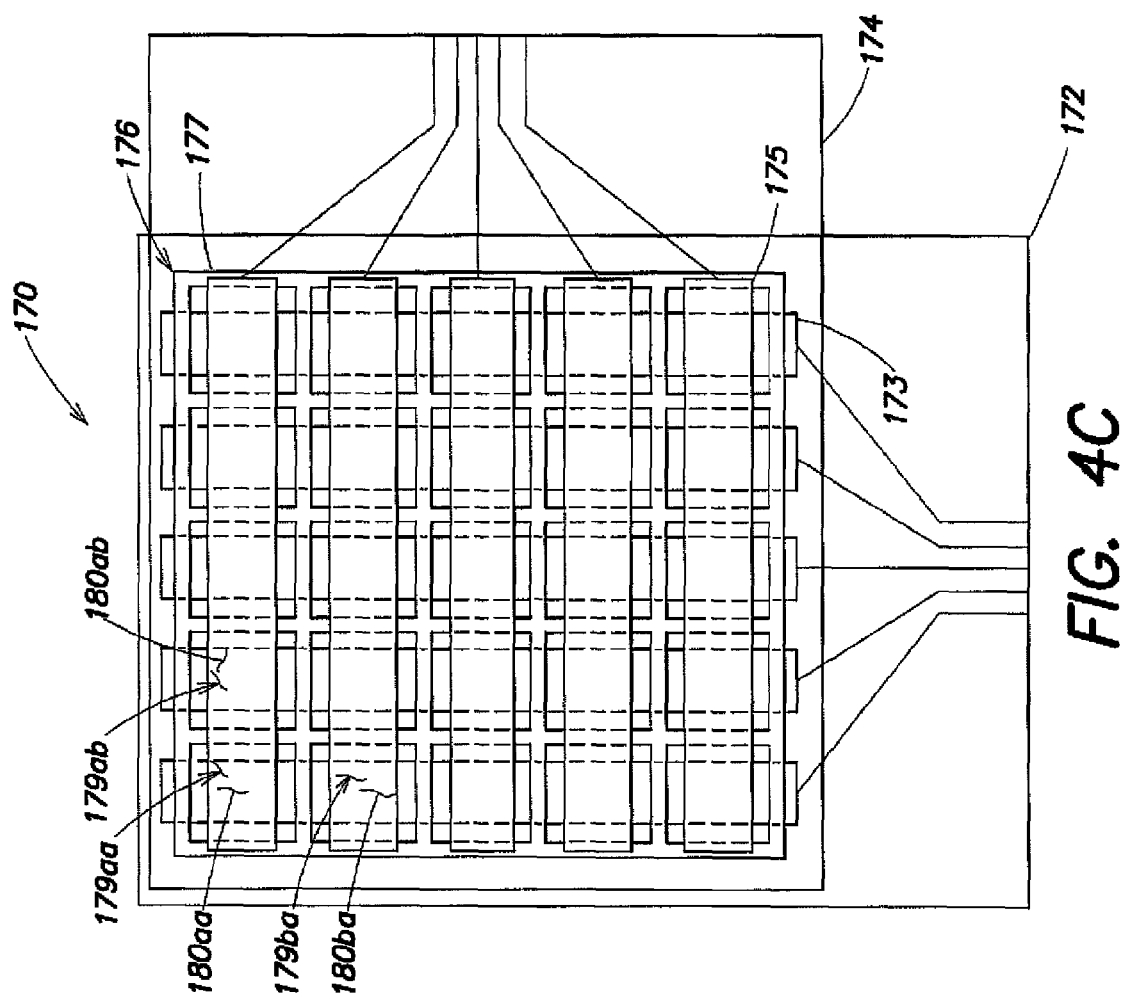
FIG. 4C schematically depicts a plan view of a capacitive two-dimensional sensing apparatus with a separation layer that forms a two-dimensional array of sensor regions, according to other embodiments of the invention.

In some embodiments, one or more separators may form a multi-dimensional array of sensor regions 60. FIGS. 4C and 4D illustrate a grid shaped separation layer 176 that separates a substrate 172 and a membrane 174 forming a two-dimensional array of sensor regions 180*aa*, 180*ab*, 180*ba*, ..., in accordance with some embodiments of the invention. As depicted, the separation layer 176 may be formed from a single member, such as separator 177. However, separation layer 176 may include many members that collectively form a grid shaped separation layer 176.

In the embodiment illustrated, separation layer 176 is formed as a grid, with each square of the grid enclosing a sensor region with a single capacitive sensing element. As illustrated, each sensor region 180*aa*, 180*ab*, 180*ba*, ... includes one capacitive sensing element 179*aa*, 179*ab*, 179*ba*, ... formed at an intersection of membrane electrodes 175 and substrate electrodes 173. However, in other embodiments, even when separation layer 176 is formed as a grid, each sensor region 180*aa*, 180*ab*, 180*ba*, ... may include more than one capacitive sensing element 179*aa*, 179*ab*, 179*ba*, ..., as the invention is not limited in this respect.

In other embodiments, an apparatus may also include slits, which can also decouple adjacent sensor regions. FIGS. 5A-5C illustrate exemplary apparatuses that each includes a membrane having a plurality of slits. Slits 100*a*, 100*b*, ... allow for reduction or elimination of mechanical cross-coupling in applied loads, such as pressure or force. That is, if a load is applied at a sensor region 60*ab* on one side of a slit 100*b*, the resulting membrane deflection and increase in membrane tension is largely isolated to sensor region 60*ab* and is not transmitted to an adjacent sensor region 60*aa* across slit 100*b*. For example, an apparatus 94 in FIG. 5A has separators 57*a*, 57*b* ... that are parallel to substrate electrodes 25 and continuous silts 100*a*, 100*b* ... that are perpendicular to separators 57*a*, 57*b* ... Sensor region 60*aa* is mechanically isolated from sensor region 60*ba* by separator 57*b* and mechanically isolated from sensor region 60*ab* by slit 100*b*. The slits 100 also are useful in the control of the effective "stiffness" of the membrane 31. That is, they can limit stretch of the membrane 31 to be primarily in a direction between adjacent separation strips as indicated by arrow 105 rather than being bi-directional. Limiting stretch to stretch along one direction can also increase the sensitivity of a capacitive element via increased membrane deflection for a given applied pressure. This increase in sensitivity may be especially pronounced for circular or curved surfaces where hoop stiffening of the membrane is consequently reduced. Apparatuses with circular or curved surfaces are described in detail below with respect to FIGS. 6A to 11B.

FIG. 5B schematically illustrates an apparatus 98 having a membrane 33 with a two-dimensional array of slits 104, in accordance with other embodiments of the invention. The slits 104 are oriented parallel to an orientation of membrane electrodes 35 and perpendicular to an orientation of separators 58.

FIG. 5C schematically illustrates an apparatus 96 having a two-dimensional array of slits 102 with an orientation perpendicular to an orientation of membrane electrodes 36, in accordance with other embodiments of the invention. The slits 102 are perpendicular to separators 59 and perpendicular to membrane electrodes 36. In the embodiment illustrated, an individual slit 102 does not extend through an entire width WE of a membrane electrode 36, allowing the membrane electrode 36 to maintain electrical contract along its length.

Example #1

An exemplary planar sensor array of 8×8 format was built according to the construction similar to that of FIG. 5B with non-continuous slits oriented parallel to membrane electrodes and an elastomeric outer layer. The planar sensor array was tested relative to two sensors of a more conventional elastomeric separation mechanism labeled conventional transducer (1) and hybrid transducer (2). Both the conventional transducer (1) and the hybrid transducer (2) employ compliant separations strips that separate opposing electrodes. In the conventional transducer (1) and the hybrid transducer (2), pressure causes the compliant separation strips to compress, which reduces a spacing between opposing electrodes. In contrast, in the exemplary planar sensor array a spacing between opposing electrodes is changed by pressure applied to the membrane, which stretches the membrane, deflecting it into the gap. Results of the tests of the exemplary planar sensor array, and tests of the conventional and hybrid sensor arrays employing compliant separation strips, are given in Table 1. The exemplary design (3) provided roughly 3× improvement in baseline repeatability relative to the conventional transducer (1) and the hybrid transducer (2). The exemplary design (3) provided a 10× to 50× improvement in thermal stability and 2× improvement in sensitivity relative to the more conventional devices (1) and (2).

Figure 9:
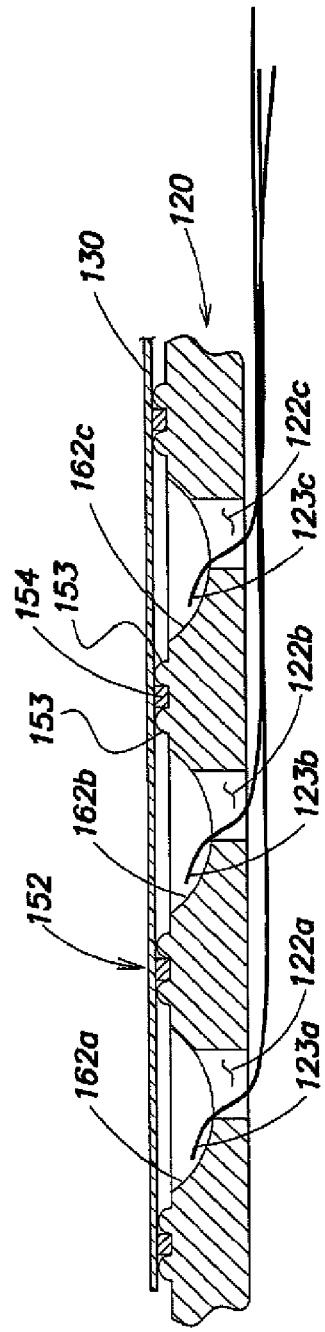
FIG. 9 is a schematic enlarged cross-sectional view of the cylindrical substrate with the membrane attached, according to some embodiments of the invention.

Substrate 120 may be formed in any suitable way, such as by machining, casting, forming, etc. For example, substrate 120 may be formed of a metal tube machined into the desired shape with a dielectric layer covering the metal. In some embodiments, the desired shape may include ribs 153 that are part of ring separators 152, as shown in FIG. 9.

TABLE 1

Construction and Testing of Tactile Array Prototypes Under Phase I for Use in the HD-MVS Probe

| Transducer Construction Method | Description | Baseline Repeatability (mmHg) | Thermal Stability (mmHg) | Sensitivity (mV/mmHg) |
| --- | --- | --- | --- | --- |
| 1. Conventional | Compliant separation strips not aligned with electrode strips | 4.3, ($\sigma = 0.3$) | −36.7, ($\sigma = 16.5$) | 3.5 |
| 2. Hybrid— thermal optimized | Same as above except compliant separation strips placed between electrode strips | 5.3, ($\sigma = 0.4$) | −10.3, ($\sigma = 5.9$) | 3.1 |
| 3. Membrane with suspended air gap | Base same as hybrid. Rigid suspension of top membrane electrodes with geometric avoidance of capacitive air gap. Sensing electrodes pre-tensioned with slits cut for mechanical decoupling. | 1.8, ($\sigma = 1.3$) | 0.8, ($\sigma = 1.6$) | 6.3 |

In other exemplary embodiments, an apparatus may have a cylindrical form factor. Details of a membrane 130, a separation structure 152, and electrical interconnections (e.g. substrate electrodes 125, membrane electrodes 135 and connections 137) for a cylindrical capacitive pressure sensing array apparatus 110 are shown and described with respect to FIGS. 6A through 11B, in accordance with aspects of the invention.

Figure 6B:
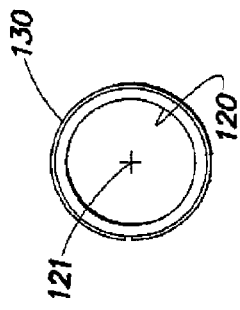
FIG. 6B schematically depicts an axial end view of the cylindrically shaped multi-dimensional capacitive sensing apparatus shown in FIG. 6A.
Figure 6A:
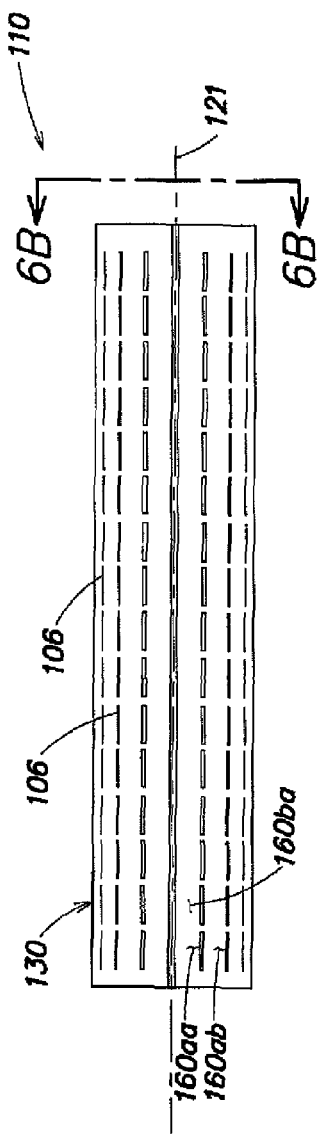
FIG. 6A schematically depicts a side view of a cylindrically shaped multi-dimensional capacitive sensing apparatus including a cylindrical substrate having a flexible rectangular membrane wrapped around it, according to other embodiments of the invention.

FIG. 6A schematically depicts a side view and FIG. 6B schematically depicts an axial view of the cylindrical apparatus 110. As shown in the axial view of FIG. 6B, the cylindrical apparatus 110 includes a flexible membrane 130 wrapped around a cylindrical substrate 120. The surface view of FIG. 7A shows that the flexible membrane 130 may include slits 106 oriented parallel to an axis 121 of the cylindrical apparatus 110.

Figure 7B:
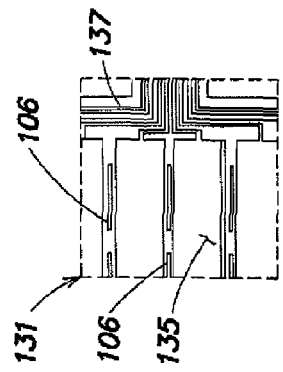
FIG. 7B is a schematic enlarged plan view of an portion of the membrane depicted in FIG. 7A.
Figure 7A:
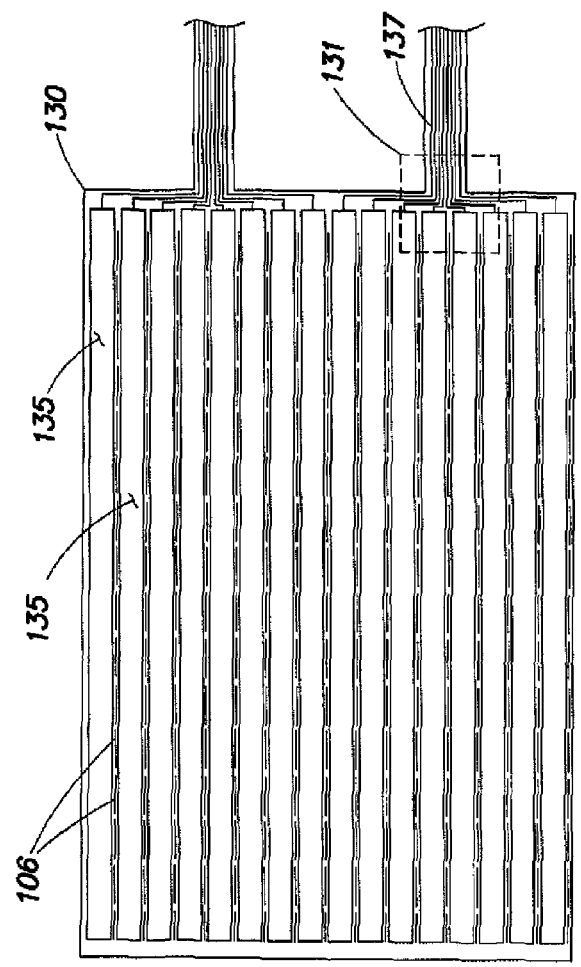
FIG. 7A schematically depicts a plan view of the flattened membrane detached from the substrate, according to some embodiments of the invention.

FIG. 7A schematically depicts a plan view of the rectangular flattened membrane 130 before it is wrapped around the cylindrical substrate 120. Membrane electrodes 135 may be oriented parallel to the axis 121 of cylindrical substrate 120 as shown by FIGS. 7A and 7B. In some embodiments, membrane electrodes 135 are conductive metal films deposited on the membrane, whether by patterning a metal coating or in any other suitable way. As schematically depicted by detail 131 of membrane 130 shown in FIG. 7B, slits 106 of membrane 130 may be oriented parallel to membrane electrodes 135. Slits 106 may be non-continuous and spaced to lie between separators of cylindrical substrate 120. Membrane 130 may include connections 137 that connect membrane electrodes 135 to other electrical components.

Membrane 130 and membrane electrodes 135 may be formed with a flex-circuit type processing. As is known to one of skill in the art, flex-circuit type processing includes depositing conductive films on flexible materials such as a polyimide, Kapton®, polyethylene terephthalate, or other suitable polymer.

Figure 8B:
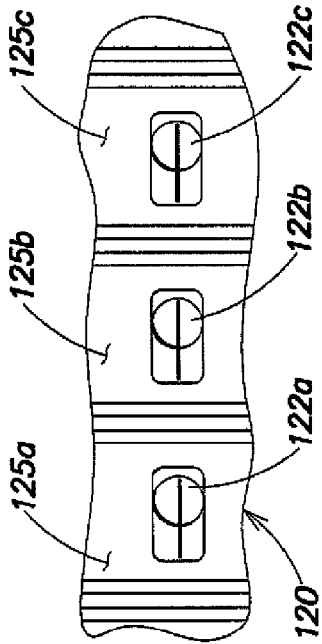
FIG. 8B is a schematic enlarged detail view of the cylindrical substrate shown in FIG. 8A.
Figure 8A:
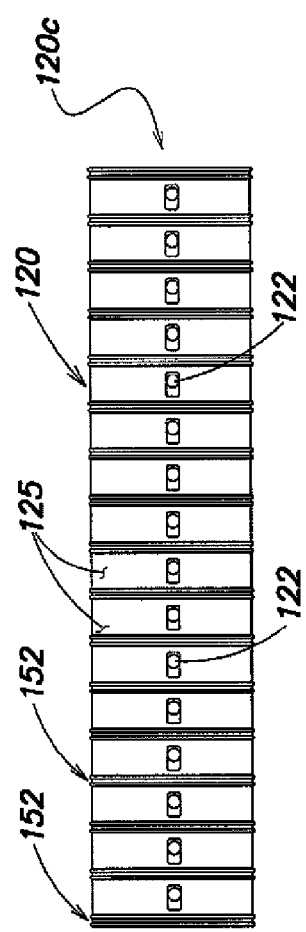
FIG. 8A schematically depicts a side view of the cylindrical substrate, according to some embodiments of the invention.

As illustrated by FIG. 8A, the substrate may have any suitable shape. For example, the substrate 120 may be a cylindrical tube with circumferential substrate electrodes 125 and circumferential ring separators 152 disposed longitudinally along axis 121 of the tube, as shown in FIGS. 8A to 9.

In some embodiments, cylindrical substrate 120 is substantially encircled by substrate electrodes 125 that are oriented substantially perpendicular to membrane electrodes 135, as depicted in FIG. 8A. Each substrate electrode 125 may be deposited on the substrate 120 between adjacent ring separators 152, making the substrate electrodes generally ring-shaped.

Regardless of the configuration of the substrate, some or all of the fabrication techniques described above may be used to form a capacitive array sensor. As illustrated by FIGS. 6A and 8A, ring separators 152 that encircle the substrate 120 are oriented to mechanically decouple adjacent sensor regions 160aa, 160ba axially along the cylindrical apparatus 110. Slits 106 of membrane 130 are oriented to mechanically decouple adjacent sensor regions 160aa, 160ab azimuthally around the cylindrical apparatus 110.

The detail cross-sectional view of the of substrate 120 and membrane 130 in FIG. 9, further illustrates separators 152. Although depicted separators 152 each include an adhesive element 154 between two ribs 153, other configurations of separators 152 may be employed as the invention is not limited in this respect. However, these examples are illustrative only, and any suitable shape of non-compliant or minimally compliant separators may be formed.

Both the detail plan view of the substrate 120 in FIG. 8B and the detail side cross-sectional view of the substrate and the membrane in FIG. 9, further illustrate the substrate electrodes 125a, 125b, 125c, and other aspects of exemplary embodiments. As illustrated, separators 152 need not have walls perpendicular to the surface of the substrate, Here, the separators are formed, in part, by machining concave grooves 162a, 162b, 162c into the surface of substrate 120. In some embodiments, one or more insulating layers may be disposed on floors of concave grooves 162a, 162b, 162c. Substrate electrodes 125a, 125b, 125c may be disposed on the insulating layers.

In some embodiments, cylindrical substrate 120 may be tubular, with a substrate lumen 120c. The tube may have an outer wall including holes 122, 122a, 122b, 122c for accessing substrate electrodes 125a, 125b 125c from within the substrate lumen 120c. Wires carrying electrical signals to or from the substrate electrodes may be routed through the lumen.

Electrical connections to substrate electrodes 125a, 125b, 125c, such as through wires 123a, 123b, 123c, may extend through the holes 122a, 122b, 122c. Wires 123a, 123b, 123c, may be part of a wiring harness. The wiring harness disposed within the substrate lumen may have a plurality of contact points, each extending through a hole to a substrate electrode 125a, 125b, 125c, In some embodiments, the wiring harness may be implemented as a flex circuit or using other similar suitable fabrication techniques. The contact points may be tabs extending from the flex circuit. Connections may be made to the substrate electrodes through the holes by soldering or otherwise making electrical connections between the tabs and the electrodes.

As a specific example, a metal tube may be machined to have grooves. The walls of the grooves may form separator elements and electrodes may be formed on the floors of the grooves. Electrodes may be formed by first depositing an insulative layer over the metal and then depositing one or more conductive layers in a pattern corresponding to the substrate electrodes. As a specific example, the conductive layers may include a nickel layer with a gold layer over the nickel.

A probe formed as described above is insensitive to bending and shear loads on the probe. Use of circumferential rings of the rigid or attached separation layer and the rigidity of the substrate itself make membrane deflection insensitive to bending and shear loads on the probe.

Example #2

Figure 10:
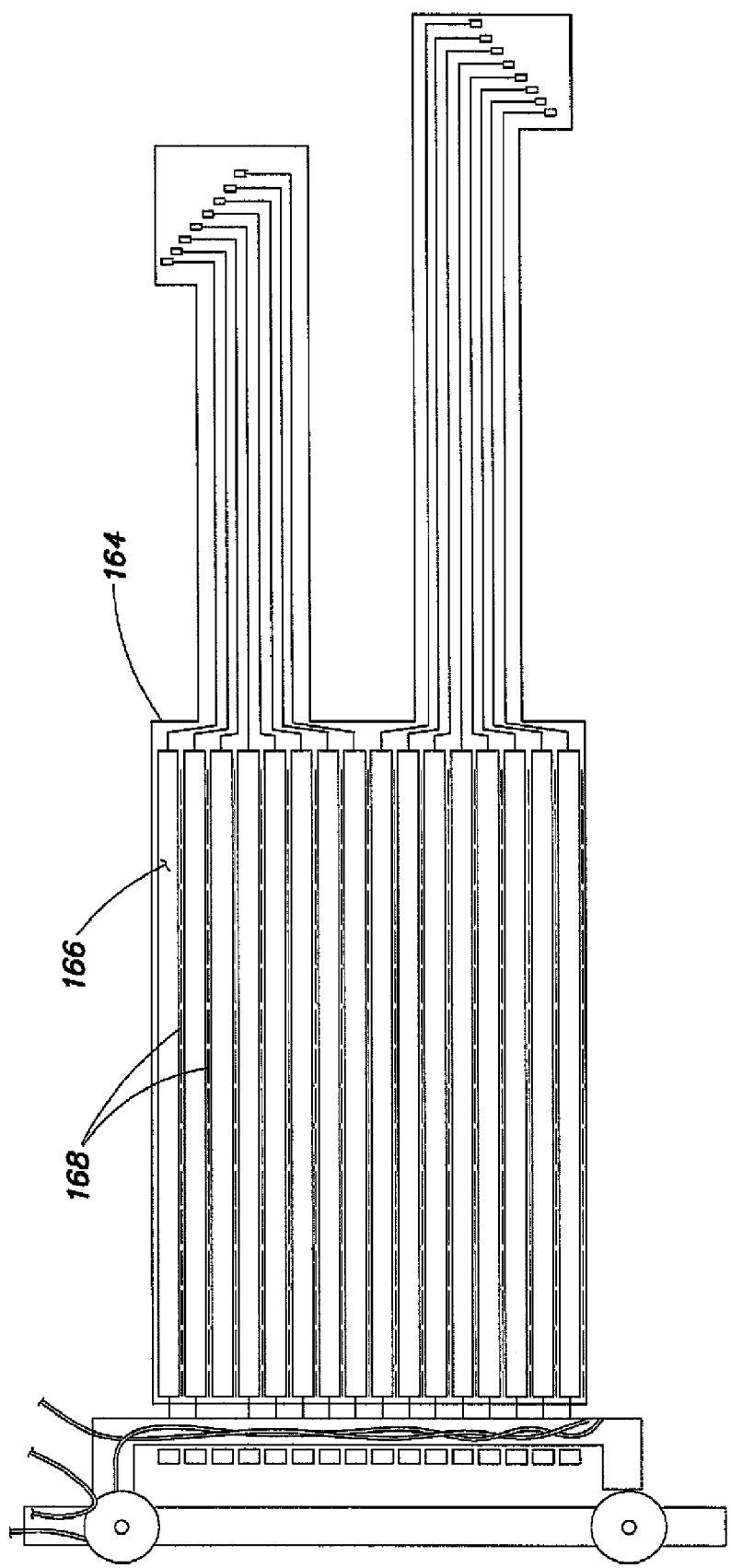
FIG. 10 is a plan view of a membrane showing membrane electrodes and segmented slits oriented parallel to the membrane electrodes, constructed in accordance with some embodiments of the invention.
Figure 11A:
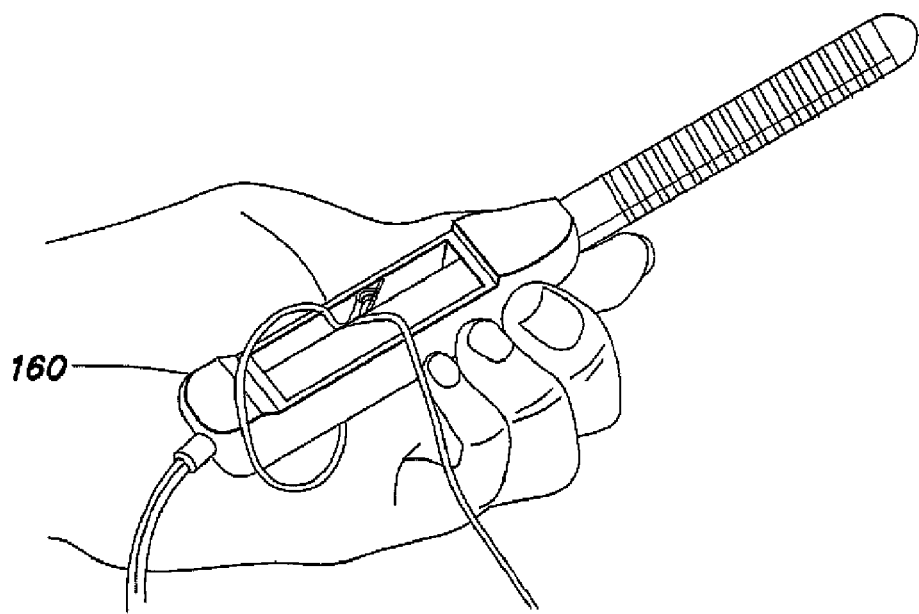
FIG. 11A shows a perspective view of a probe including a cylindrical sensor array mounted on a handle with connected wiring, constructed in accordance with some embodiments of the invention.
Figure 11B:
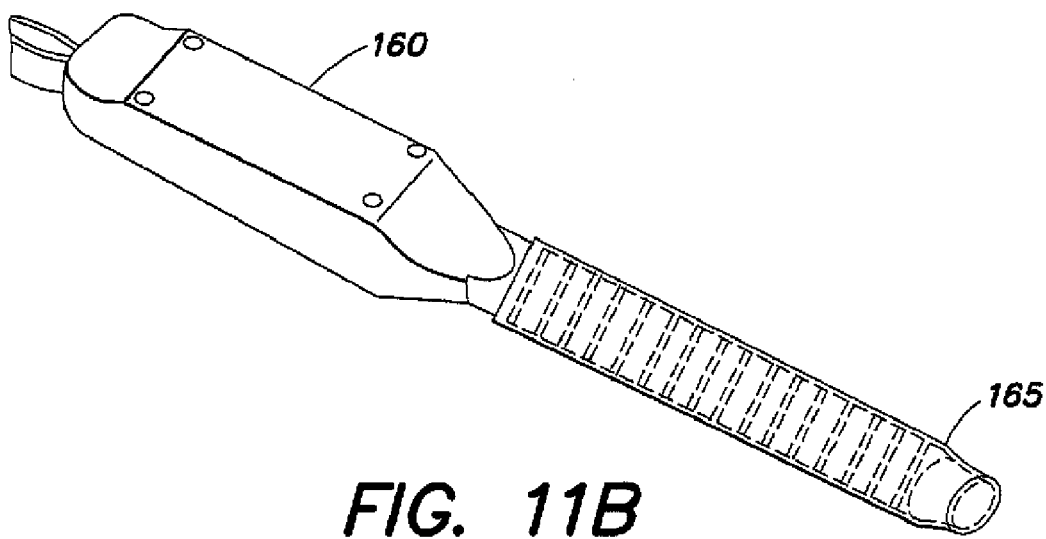
FIG. 11B shows a perspective view of the probe shown in FIG. 11A with a thin elastomeric sleeve fitted to an outside of the array, constructed in accordance with some embodiments of the invention.

A probe with a 16×16 cylindrical array of sensors was built using the cylindrical apparatus sensor design depicted in FIGS. 6A through 8B. The substrate included a cylindrical metal member coated with dielectric material and plated to effect conducting electrode rings. FIG. 10 shows a flattened membrane 164 of the probe before it is applied to the cylindrical metal member of the probe. The flattened membrane includes axially oriented membrane electrode electrodes 166 in the form of strips that face the cylindrical member, and slits 168 oriented parallel to the electrodes. FIG. 11A shows the probe 160 and wiring that connects the substrate electrodes and the membrane electrodes with electronics external to the probe 160. FIG. 11B shows the probe 160 with a thin elastomeric sheath 165 fitted to the outside of the sensor apparatus.

As shown in FIG. 11A, a sensor array may be sized on a macro scale for applications requiring an array of sensing element that covers a macroscopically large area. The probe depicted in FIG. 11A is sized for measuring a spatial distribution of pressure with a gastrointestinal tract. As is apparent from the FIG. 11A, the illustrated GI probe has a macro scale sensing array, with dimensions between approximately 1-4 inches in length and between approximately 0.5-2 inches in circumference.

Another embodiment of the invention provides a method of making a capacitive multi-dimensional sensing apparatus. Although the exemplary method may be used to make different configurations of capacitive multi-dimensional sensing apparatuses, an embodiment of the method will be described with respect to apparatus 10 depicted in FIGS. 1A to 2C, with respect to apparatus 96 depicted in FIG. 5C, and with respect to apparatus 110 depicted in FIGS. 6A to 9 solely for illustrative purposes.

Figure 12:
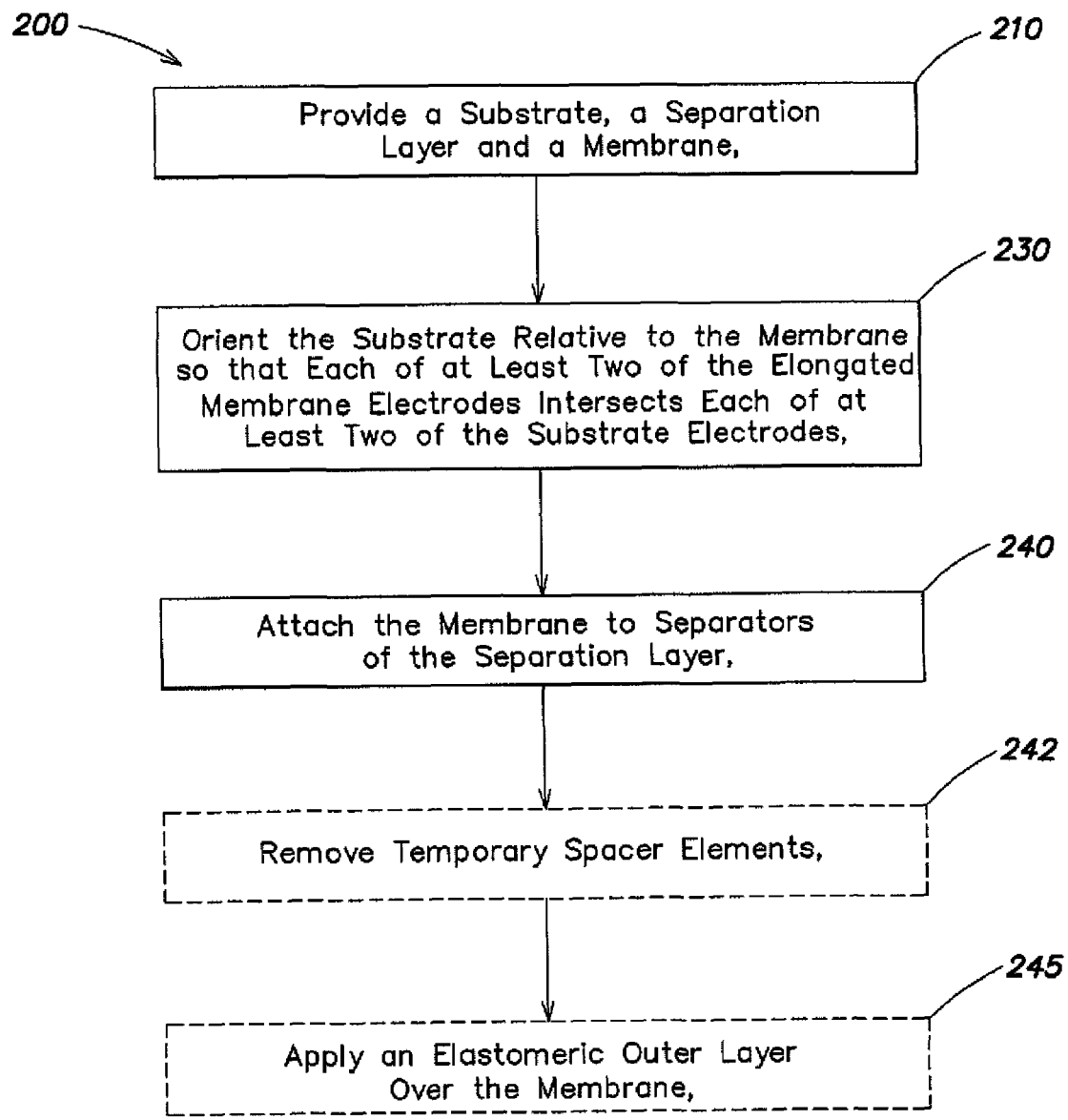
FIG. 12 is a flow chart of a method of making a capacitive multi-dimensional sensing apparatus, in accordance with other embodiments of the invention.

FIG. 12 is a flow chart illustrating a method 200 of making a capacitive multi-dimensional sensing apparatus 10, in accordance with other embodiments of the invention. Initially a substrate 20, a separation layer (50) and a membrane (30) are provided (step 210). These components may be provided as separate members that are later integrated. Alternatively, the separation layer 50 may be provided integrated with either substrate 20 or membrane 30.

The substrate 20 includes elongated substrate electrodes 25. The separation layer (50) includes one or more separators 52. The membrane includes one or more elongated membrane electrodes (35).

In some embodiments, providing substrate 20 includes machining a substrate body. In other embodiments, providing substrate 20 includes casting substrate 20 or forming substrate 20 using another suitable method. If substrate 20 is machined or formed from a conductive material, a dielectric layer may be deposited over the conductive material of the substrate. In some embodiments, elongated substrate electrodes 25 are deposited onto a substrate body. For example, standard etching may be used to create elongated substrate electrodes 25. In other embodiments, elongated substrate electrodes 25 may be formed separately and attached to substrate 20 by any suitable means or methods of attachment.

In some embodiments, at least a portion of separators 52 is monolithic with substrate 20. Portions of monolithic separators 52 may be formed by machining or etching channels and/or grooves into a substrate body. For example, portions of monolithic separators 52 may be produced using preformed epoxy strips, and/or computer numerical control (CNC) machining. In other embodiments, no portion of separators is monolithic with substrate 20. In other embodiments, providing substrate 20 and separation layer 50 may include depositing at least a portion of one or more separators 52 on substrate 20.

In some embodiments, one or more of separators 52 may be formed separately. Method 200 may further include attaching separators 52 to substrate 20. Separators 52 may be attached to substrate 20 before membrane 30 is attached to separators 52, after membrane 30 is attached to separators 52, or while membrane 30 is attached to separators 52, as the invention is not limited in this respect.

In some embodiments, membrane 30 and membrane electrodes 35 are produced with flex-circuit type processing. As is known to one of skill in the art, flex-circuit type processing may include patterning, through etching or other suitable processes, conductive films on flexible substrates such as polyimide or Kapton®, polyethylene terephthalate or other suitable polymer membrane materials or any other material that is stable and elastomeric. Thus, providing membrane 30 having membrane electrodes 35 may include patterning conductive film electrodes on a flexible polymer film in a desired shape.

In some embodiments, providing a membrane may include forming a plurality of slits in the membrane. The plurality of slits may include an array of continuous slits 100a, 100b ... as depicted in FIG. 5A and/or the plurality of slits may include a two-dimensional array of slits 104 as depicted in FIG. 5B. The plurality of slits may be formed parallel to membrane electrodes 35 as depicted in FIG. 5B, perpendicular to membrane electrodes 36 as depicted in FIG. 5C or an another angle with respect to membrane electrodes 35. The slits may be configured to be oriented perpendicular to an orientation of spacers 42, as shown in FIGS. 5A to 5C. The slits may be formed in any suitable way, such as by punching out or laser-cutting regions of the membrane.

Substrate 20 is oriented relative to membrane 30 so that each of at least two of elongated membrane electrodes 35 intersects each of at least two of substrate electrodes forming a multi-dimensional array of capacitive elements 40 (step 230). As described above, the term "intersecting" may also be described as overlaying because substrate electrodes 25 and the membrane electrodes 35 remain separated by separators or a gap.

Separators 52 of the separation layer 50 are attached to the membrane 30 by any suitable method or means (step 240). Substrate 20 may be oriented relative to membrane before separators 52 are attached to membrane 30 or after separators 52 are attached to membrane 30. For example, separators 52 may be attached to membrane 30 before substrate 20 is oriented relative to membrane 30, and separators 52 may be attached to substrate 20 after substrate 20 is oriented relative to both separators 52 and attached membrane 30.

Separation layer 50 may be put under a compressive load when the separation layer is attached to the membrane 20. In some embodiments, a separation $h_0$ between the substrate 20 and the membrane 30 may remain constant while the membrane 30 is being attached to the separation layer 50. For example, the separation layer 50 may include epoxy strips where the epoxy contains a matrix material, such as a spacing aggregate of a controlled diameter, that minimizes change in thickness during bonding between separators 52 and membrane 30.

In some embodiments spacer elements (e.g. glass beads, teflon strips, etc.) may be positioned in open portions 51 of separation layer 50. Spacer elements may be positioned before separators 52 are attached to the membrane 30, while separators 52 are being attached to the membrane 30 or after separators 52 have been attached to the membrane 30. For example, if membrane 30 is attached to separators 52 before separators 52 are attached to substrate 20, spacer elements may be into open portions 51 of separation layer 50 after membrane 30 is attached to separators 52, but before separators 52 are attached to substrate 20. Spacer elements may remain in the open portions 51 of the separation layer 50 or may be temporary and removed after membrane 30, separation layer 50 and substrate 20 are connected (step 242).

In some embodiments, a method 200 of making a multidimensional array sensing apparatus 10 may include applying an elastomeric outer layer 80 over membrane 30 (step 245), as shown in FIG. 2C. As described above, the elastomeric outer layer 80 protects membrane 30 and separates fluid (i.e. liquid or gas) in the gap between membrane 30 and substrate 20 from fluid outside apparatus 10 when membrane 30 includes slits.

Some embodiments of the invention provide a method 260 of operating a multidimensional capacitive sensing apparatus. Although exemplary method 260 may be used to operate different configurations of multidimensional array sensing apparatuses, embodiment 260 will be described with respect to apparatus 10 depicted in FIGS. 1A to 2C and apparatus 96 in depicted FIG. 5C, solely for illustrative purposes.

Figure 13:
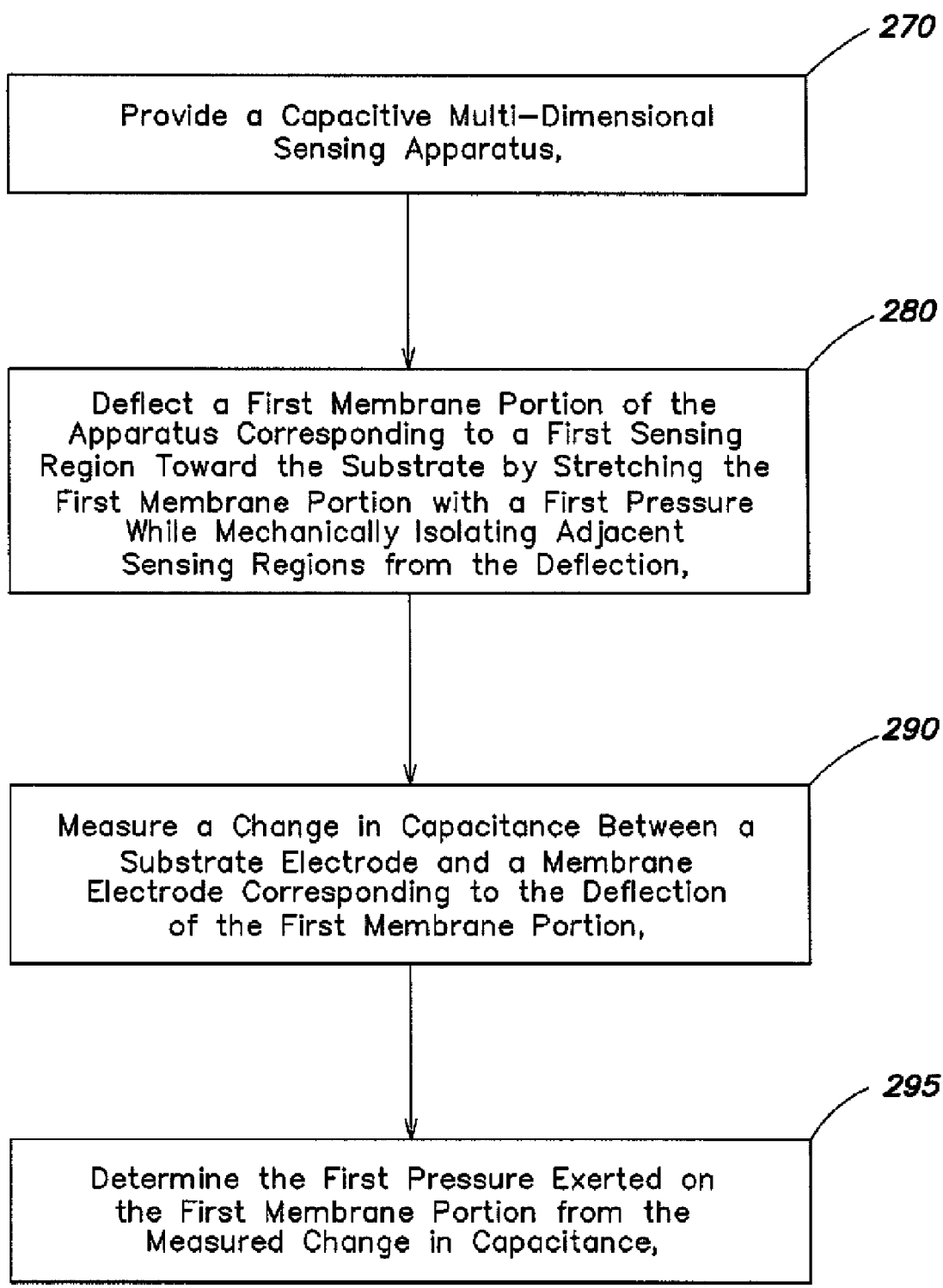
FIG. 13 is a flow chart of a method of using a capacitive multi-dimensional sensing apparatus, in accordance with other embodiments of the invention.

FIG. 13 is a flow chart illustrating method 260 of operating a multidimensional array sensing apparatus 10. In accordance with the illustrated method 260, initially a capacitive multidimensional sensing apparatus 10 is provided (step 270). Providing the sensing apparatus may include positioning the apparatus in a bodily lumen or other location where a pressure measurement is desired.

The apparatus may include a substrate 20 having a plurality of substrate electrodes 25 and a membrane 30 having a plurality of membrane electrodes 35. Each of at least two of the substrate electrodes 25 may intersect more than one membrane electrode 35. The intersections of substrate electrodes 25 and membrane electrodes 35 form a multidimensional array of capacitive elements 40. Apparatus 10 include a separation layer 50 having open portions 51 corresponding to a plurality of sensor regions 60, wherein the open portions do not comprise solid material.

As a result of pressure on the apparatus, at least a first membrane portion 30b corresponding to first a sensor region 60b is deflected toward the substrate with a first pressure $P_b$, stretching the first membrane portion 30b while mechanically isolating adjacent sensor regions 60a, 60c from the deflection (step 280). A change in capacitance is measured between a substrate electrode 25 and a membrane electrode 35 corresponding to the deflection of membrane portion 30b (step 290). The method may also include determining a pressure exerted on membrane portion 30b from the measured change in capacitance (step 295).

The method may further include deflecting other membrane portions, such as portion 30a corresponding to a second sensor region 60a toward the substrate 20 by stretching membrane portion 30a with a second pressure while mechanically isolating adjacent sensor regions 60b from the second pressure and the increase in membrane tension, and while deflecting the first membrane portion 60a with the first pressure $P_b$. The method 260 may include measuring a change in capacitance between a substrate electrode 25 and a membrane electrode 35 corresponding to the deflected second membrane portion 30b.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An apparatus for capacitively sensing force or pressure, the apparatus comprising:

a substrate;

a plurality of elongated substrate electrodes disposed at the substrate;

a membrane configured to deflect in response to force or pressure applied to the membrane;

a plurality of elongated membrane electrodes disposed at the membrane, wherein each of at least two of the plurality of membrane electrodes intersects each of at least two of the plurality of substrate electrodes forming a multi-dimensional array of capacitive elements having a capacitive element at each intersection; and a plurality of separators fixedly connected with the substrate and separating the substrate and the membrane, thereby forming a plurality of sensor regions of the apparatus with sensor regions positioned between adjacent separators of the plurality of separators each including at least one capacitive element;

wherein a membrane portion of each sensor region is mechanically decoupled from a membrane portion of each adjacent sensor region;

wherein the substrate is cylindrical with a central substrate axis extending along a center of the cylindrical substrate; and wherein the substrate comprises:
an outer surface comprising a plurality of grooves formed therein, each groove having a floor;
one or more insulating regions at the floors of the plurality of grooves, each of the plurality of substrate electrodes being disposed on the one or more insulating regions;
a lumen parallel to the central substrate axis; and
a plurality of holes, each hole passing through the substrate from the lumen to a substrate electrode of the plurality of substrate electrodes.

2. The apparatus of claim 1, wherein the membrane is attached to each separator in the plurality of separators.

3. The apparatus of claim 1, further comprising a plurality of elongated slits in the membrane, wherein each sensor region is bound by one or more separators and one or more slits.

4. The apparatus of claim 1, wherein the plurality of elongated substrate electrodes comprises a plurality of parallel elongated substrate electrodes.

5. The apparatus of claim 1, wherein the plurality of elongated membrane electrodes comprises a plurality of parallel elongated membrane electrodes.

6. The apparatus of claim 1, wherein an orientation of plurality of substrate electrodes is substantially perpendicular to an orientation of the plurality of membrane electrodes.

7. The apparatus of claim 1, wherein the plurality of separators comprises a plurality of parallel elongated separators and the sensor regions are mechanically decoupled, at least in part, by attaching the membrane to the plurality of separators.

8. The apparatus of claim 7, further comprising a plurality of elongated slits in the membrane, wherein each slit in the plurality of elongated slits is oriented perpendicular to an orientation of an elongated separator in the plurality of parallel elongated separators.

9. The apparatus of claim 1, wherein a side of the substrate facing the membrane is substantially cylindrically curved.

10. The apparatus of claim 1, wherein the membrane substantially encircles the cylindrically-shaped substrate.

11. The apparatus of claim 1, wherein the separators substantially encircle the central substrate axis.

12. The apparatus of claim 11, wherein the elongated substrate electrodes substantially encircle the central substrate axis.

13. The apparatus of claim 1, wherein the elongated membrane electrodes are substantially parallel to the central substrate axis.

14. The apparatus of claim 1, further comprising:
a wiring harness disposed within the lumen, the wiring harness having a plurality of contact points extending therefrom, each contact point being electrically coupled through a hole of the plurality of holes to a substrate electrode.

15. The apparatus of claim 1, wherein the membrane comprises a plurality of slits.

16. The apparatus of claim 15, wherein the slits are oriented substantially parallel to the central substrate axis.

17. The apparatus of claim 1, further comprising an elastomeric sleeve encircling the central substrate axis and covering a side of the membrane facing away from the substrate.

18. The apparatus of claim 1, wherein the apparatus is cylindrical with a diameter suitable for use as an instrument to be inserted into the gastrointestinal tract of a subject.

19. The apparatus of claim 1, wherein a total area of the sensor regions of the apparatus is at least about 1 square inch.

20. The apparatus of claim 1, wherein the plurality of membrane electrodes are disposed on a side of the membrane that faces the substrate.

21. The apparatus of claim 1, further comprising an elastomeric cover adjacent to a side of the membrane that faces away from the substrate.

22. The apparatus of claim 1, wherein the membrane comprises a polyimide and/or a polyethylene terephthalate.

* * * * *